(12) United States Patent
Kotler et al.

(10) Patent No.: US 9,176,933 B2
(45) Date of Patent: Nov. 3, 2015

(54) APPLICATION OF MULTIPLE CONTENT ITEMS AND FUNCTIONALITY TO AN ELECTRONIC CONTENT ITEM

(75) Inventors: Matthew J. Kotler, Sammamish, WA (US); Michael Ivan Borysenko, Redmond, WA (US); Ned B. Friend, Seattle, WA (US); Erez Kikin-Gil, Redmond, WA (US); Charles W. Parker, Sammamish, WA (US); Jesse Clay Satterfield, Seattle, WA (US); Scott M. Stiles, Sammamish, WA (US); Igor Zaika, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/272,740

(22) Filed: Oct. 13, 2011

(65) Prior Publication Data

US 2013/0097490 A1  Apr. 18, 2013

(51) Int. Cl.
*G06F 17/00* (2006.01)
*G06F 17/21* (2006.01)
*G06F 17/30* (2006.01)

(52) U.S. Cl.
CPC .......... *G06F 17/21* (2013.01); *G06F 17/30896* (2013.01)

(58) Field of Classification Search
CPC ..................... G06F 17/30896; G06F 17/30056
USPC ................... 715/202, 209, 210, 255
See application file for complete search history.

(56) References Cited

U.S. PATENT DOCUMENTS

| | | | |
|---|---|---|---|
| 6,560,620 B1* | 5/2003 | Ching | 715/229 |
| 6,820,111 B1 | 11/2004 | Rubin et al. | 709/203 |
| 6,907,569 B1 | 6/2005 | Craft | 715/708 |
| 7,337,392 B2* | 2/2008 | Lue | 715/236 |
| 7,496,830 B2 | 2/2009 | Rubin et al. | |
| 7,548,915 B2 | 6/2009 | Ramer et al. | |
| 7,801,885 B1 | 9/2010 | Verma | |

(Continued)

FOREIGN PATENT DOCUMENTS

| | | | |
|---|---|---|---|
| CN | 1125492 A | 6/1996 | |
| WO | 9827497 A1 | 6/1998 | |

OTHER PUBLICATIONS

Robert Cannon, et al. *Enhancing Document with Annotations and Machine-Readable Structured Information Using Notate.* Published Mar. 4, 2007. http://www.textensor.com/enhancing-documents-2007.html. pp. 20.

(Continued)

*Primary Examiner* — Laurie Ries
(74) *Attorney, Agent, or Firm* — Jessica Meyers; Danielle Johnston-Holmes; Micky Minhas

(57) ABSTRACT

Application of content and associated functionality from multiple content sources to an electronic content item is provided. Content from a first document may be displayed over a second document via a user interface component. If desired, such content may be inserted into the second document, and application functionality associated with the inserted content may be retained after it is inserted into the second document. One or more navigation means may be provided for conveniently navigating inside a content item (e.g., a document) for adding new content or for reviewing or editing existing content. In addition, a number of content views and content mappings may be provided.

19 Claims, 23 Drawing Sheets

(56) References Cited

U.S. PATENT DOCUMENTS

| | | | |
|---|---|---|---|
| 8,086,960 B1 | 12/2011 | Gopalakrishna et al. | |
| 8,176,515 B2* | 5/2012 | Ahmad et al. | 725/43 |
| 8,239,497 B2 | 8/2012 | Kazerouni et al. | |
| 8,296,654 B2 | 10/2012 | Ahlberg et al. | |
| 8,321,463 B2 | 11/2012 | Cierniak et al. | |
| 8,531,571 B1* | 9/2013 | Cote | 348/333.01 |
| 2003/0135538 A1* | 7/2003 | Takeuchi et al. | 709/200 |
| 2004/0085354 A1 | 5/2004 | Massand | 345/751 |
| 2004/0233235 A1* | 11/2004 | Rubin et al. | 345/738 |
| 2006/0041556 A1* | 2/2006 | Taniguchi et al. | 707/10 |
| 2006/0236254 A1* | 10/2006 | Mateescu et al. | 715/762 |
| 2006/0282762 A1 | 12/2006 | Diamond et al. | 715/512 |
| 2007/0277093 A1* | 11/2007 | Joshi et al. | 715/512 |
| 2008/0270406 A1* | 10/2008 | Flavin et al. | 707/8 |
| 2009/0177997 A1* | 7/2009 | Do et al. | 715/789 |
| 2009/0210828 A1 | 8/2009 | Khan | 715/854 |
| 2009/0217150 A1 | 8/2009 | Lin | 715/232 |
| 2009/0235187 A1* | 9/2009 | Kim et al. | 715/760 |
| 2010/0031162 A1* | 2/2010 | Wiser et al. | 715/747 |
| 2010/0218127 A1* | 8/2010 | Wurzer | 715/764 |
| 2010/0228693 A1* | 9/2010 | Dawson et al. | 706/12 |
| 2011/0010665 A1 | 1/2011 | Deluca et al. | |
| 2011/0021250 A1 | 1/2011 | Ickman et al. | |
| 2011/0206023 A1* | 8/2011 | Cohn et al. | 370/338 |
| 2012/0023534 A1 | 1/2012 | Dasilva et al. | |
| 2012/0198361 A1 | 8/2012 | Ganimasty et al. | |
| 2012/0254770 A1 | 10/2012 | Ophir | |
| 2012/0290950 A1 | 11/2012 | Rapaport et al. | |
| 2012/0320083 A1 | 12/2012 | Zhu et al. | |
| 2013/0097481 A1 | 4/2013 | Kotler et al. | |

OTHER PUBLICATIONS

Dmitri Popov. *Co-ment: Document Collaboration and Annotation Tool*. Published Apr. 2, 2010. http://www.linux-magazine.com/Onlin/Blogs/Productivity-Sauce-Dmitri-s-open-source-blend-of-productive-computing/co-ment-Document-Collaboration-and-Annotation-Tool. pp. 2.

Marja-Riitta Koivunen, et al. *Collaboration Through Annotations in the Semantic Web*. Published May 7, 2006. http://annotea.org/2003/annotationbook/annotea.htm. pp. 10.

Guillaum Cabanac, et al. *A Social Validation of collaborative Annotations on Digital Documents*. Published Nov. 24-25, 2005. ftp://ftp.irit.fr/IRIT/SIG/2005_IWAC_CCCJpdf. pp. 10.

Aditya Kalyanpur, et al. *A Threaded Interface for Collaborative Annotation of PDF Documents*. Published Jul. 15, 2007. http://www.mindswap.org/~aditkal/pdforum.pdf. pp. 9.

*Collaborative Computing*. Retrieved on Jul. 19, 2010. http://www.google.co.uk/url?sa=t&source=web&cd=1&ved=0CBUQFjAA&url=http%3A%2F%2Fwww.adaptivesoftware.biz%2Farchive%2Fdocuments%2FCollaborative%2520Computing.doc&ei=kjFFTP-pLpSi0gSfieGpDw&usg=AFQjCNH9FSalmsKfKXKLpbxZBBOsfo5BQ. pp. 5.

Michael F. Ruffini. *Using E-Maps to Organize and Navigate Online Content*. Published Jan.-Mar. 2008. http://www.educause.edu/EDUCAUSE+Quarterly/EDUCAUSEQuarterlyMagazineVolum/UsingEMapstoOrganizeandNavigat/162517. pp. 2.

Airaj Fatimah. *Collaborating on Documents with Multiple Users in Google Docs*. Published Apr. 14, 2010. http://www.brighthub.com/internet/google/articles/8236.aspx. pp. 2.

*Guide to MLA Parenthetical Documentation*. Published Jan. 2007. http://www.ithaca.edu/library/research/mla_parenthetical.pdf. pp. 7.

*Module 14: Splitter Windows and Multiple Views*. Retrieved on Jul. 20, 2010. http://www.tenouk.com/download/pdf/visualcplusmfc14.pdf. pp. 55.

*Non-Linear PowerPoint Presentations*. Retrieved on Jul. 20, 2010. http://www.guidesandtutorials.com/non-linear-powerpoint-overview.html. pp. 3.

Office Action mailed Dec. 5, 2012, in co-pending U.S. Appl. No. 13/272,363.

Matthew J. Kotler et al., U.S. Appl. No. 13/272,363, filed Oct. 13, 2011.

Office Action mailed May 1, 2013, in co-pending U.S. Appl. No. 13/272,363.

Office Action mailed Jan. 13, 2014, in co-pending U.S. Appl. No. 13/272,363.

Office Action mailed Aug. 25, 2014, in co-pending U.S. Appl. No. 13/272,363.

Notice of Allowance mailed Feb. 24, 2015, in co-pending U.S. Appl. No. 13/272,363.

"Chinese Office Action Received for Chinese Patent Application No. 201210388898.5", Mailed Date: Sep. 5, 2014, 13 Pages.

"Second Office Action Received for Chinese Patent Application No. 201210388898.5", Mailed Date: Apr. 30, 2015, 8 Pages.

* cited by examiner

APPLICATION OF MULTIPLE CONTENT ITEMS AND FUNCTIONALITY TO AN ELECTRONIC CONTENT ITEM

RELATED APPLICATIONS

This application is related to U.S. patent application Ser. No. 13/272,363, "APPLICATION OF COMMENTS IN MULTIPLE APPLICATION FUNCTIONALITY CONTENT", filed Oct. 13, 2011, the entire content of which is hereby incorporated by reference.

BACKGROUND

Since the advent of computers and computer systems, a multitude of software applications have been developed to allow users to create and utilize a variety of electronic content items. For example, users create and utilize word processing documents, spreadsheet documents, presentation documents, Internet-based content, and the like. Often, a user desires to mix or combine content from a variety of application functionality sources in a single document. For example, a user may want to add a spreadsheet chart to a word processing-based letter or memo, or the user may want to incorporate information from an Internet-based web site into the example letter or memo. Typically, the user must launch a first document, copy or cut content from the first document and associated application and functionality, followed by pasting the content into a second document. For example, the user may copy a chart from a spreadsheet application into a word processing document. Such a process is time consuming and cumbersome, and the functionality associated with the first application/document content item may be limited when the content item is copied to or pasted into the second document and associated application functionality.

It is with respect to these and other considerations that the present invention has been made.

SUMMARY

Embodiments of the present invention solve the above and other problems by providing application of content and associated functionality from multiple content sources to an electronic content item. According to embodiments, content from a first document may be displayed over a second document via a user interface component. For example, supporting content may be shown transparently in a document in relation to document content it supports. For another example, a paragraph from an Internet-based web page that is linked to a sentence contained in a word processing document may be shown in the word processing document in proximity to the content to which it is linked. If desired, such content may be inserted into the second document, and application functionality associated with the inserted content may be retained after it is inserted into the second content item (e.g., second document). For example, content inserted into a word processing document from a spreadsheet document may be utilized in association with the spreadsheet document application functionality after it is inserted into the word processing document.

According to other embodiments, one or more navigation means may be provided for conveniently navigating inside a content item, (e.g., a document) for adding new content or for reviewing or editing existing content. In addition, a number of content views may be provided. For example, alternate views of a section of a document may be shown where one is ordered alphabetically and another ordered by importance. A highlighting of portions of a content item, (e.g., document) one or more users have reviewed or edited may be shown. A highlighting of portions of a content item not reviewed by one or more users may be shown, and a highlighting of portions of a content item that may have changed since a last review or edit by a given user may be shown. Such portions of a content item may be assembled into a single separate document if desired, and one or more structural visual mappings of one or more components of a content item may be shown. As such portions of a content item are generated for the various views, semantic information and metadata may be applied to the portions to allow for identifying the portions for pivoting among the various views and for optimizing the portions of the content item for use with different device types (e.g., mobile phones, tablet computers, wall-type computer devices/displays, etc.).

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
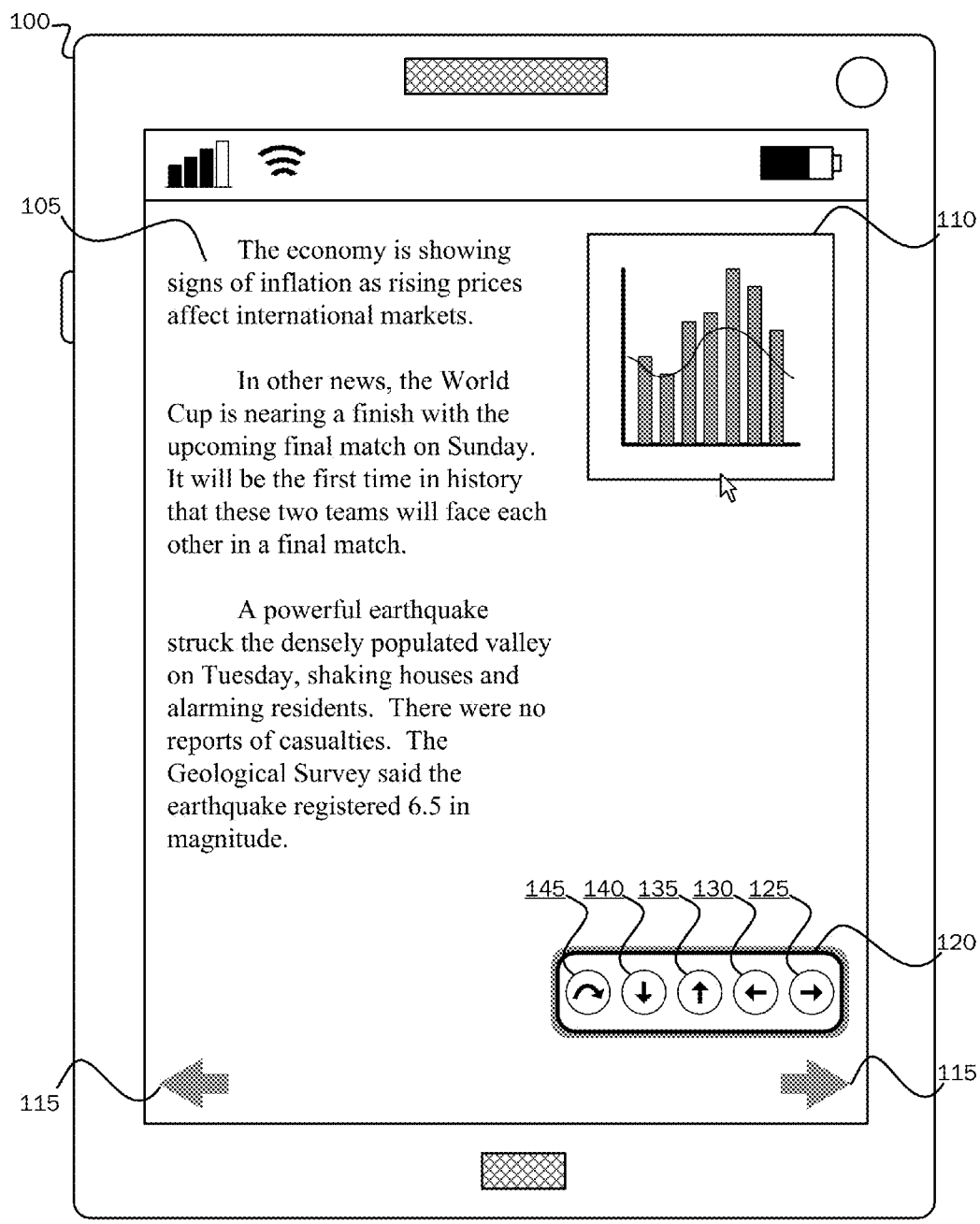
FIG. 1 is a simplified block diagram illustrating a computer-generated display on which is displayed document content and one or more means for navigating the document content.

As briefly described above, embodiments of the present invention are directed to application of multiple content types and multiple application functionality to an electronic content item. According to embodiments, a given electronic content item, for example, a text document, a spreadsheet document, a slide presentation document, an Internet-based content document, and the like, may receive content from a variety of other content types for incorporation into the first content item, and application functionality associated with received content types may be utilized with those content types after they are received and incorporated into the first content item. For example, a word processing document may receive content items from a spreadsheet application document, a slide presentation application document and an Internet-based web page document.

Application functionality associated with received content items may function with the received content items after the content items are incorporated into the first content item (e.g., document), as described in detail below with reference to FIGS. 13-17. For example, if a word processing document receives a spreadsheet application chart, the chart may be incorporated "in line" with the word processing document, for example, between two paragraphs contained in the word processing document, and application functionality associated with the received chart, for example, spreadsheet application functionality, may be utilized with the received chart. That is, if a user focuses on, selects, or otherwise interacts with the received and incorporated example spreadsheet application chart, spreadsheet application functionality will be available to the user during his/her interaction with the spreadsheet application chart in the word processing document. According to other embodiments, a variety of document/content item navigation means may be provided, and a variety of document/content item views may be provided.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram illustrating a computer-generated display on which is displayed document content and one or more means for navigating the document content. The computer-generated content item 105, 110 is illustrated in a display screen of an example computing device 100. According to embodiments, the computing device 100 may be in the form of a variety of acceptable computing devices, for example, a general purpose computing device, personal computer, a laptop computer, a tablet computer, a slate-type computer, a mobile computer, a hand held telephonic computer (e.g., mobile telephone or smart phone), and the like.

According to embodiments, content 105, 110 may be entered, edited, or otherwise interacted with according to a variety of input means. Suitable input means include, but are not limited to, keyboard/mouse entry/interaction, touch screen interaction, for example, where a user writes, draws, or otherwise interacts with software application functionality through touching the display screen of the computing device 100, electronic pen/stylus interaction, voice command, wherein for example, a user issues commands to software application functionality or issues voice-based content entry, gesture commands, and the like. According to an embodiment, for purposes of receiving voice-based and gesture-based input, the device 100 may be coupled a microphone operative to capture voice commands, and the device 100 may be coupled a camera operative to record and capture motions and/or gestures made by a user. Such a camera may be operative to provide motion detection capable of detecting movement from users for interpreting the movements as commands for causing changes in application functionality. For example, a camera may comprise a Microsoft® Kinect® motion capture device comprising a plurality of cameras and a plurality of microphones for capturing both motion and voice or other audio information.

The document 105 illustrated on the display screen of the computing device 100 is illustrative of a variety of electronic computer-generated or computer-enabled content items, for example, text-based word processing documents, spreadsheet documents, slide presentation slides, Internet-based web pages, and the like, enabled according to a variety of suitable software applications, for example, word processing applications, spreadsheet applications, slide presentation applications, Internet-based web browsing applications, and the like. Similarly, the chart 110 illustrated in the document 105 may be generated by and displayed according to one or more software applications suitable for generating and displaying charts or other images.

According to embodiments, as will be described below, a multiple content functionality application 1920, illustrated below with respect to FIGS. 19, 20B and 21, may be utilized in association with the computing device 100 for generating and displaying the text and chart 105, 110, illustrated in FIG. 1. According to embodiments, the multiple content functionality application 1920 is a software application operative to provide multiple document/content generation and editing functionalities, or operative to obtain those functionalities from one or more other software applications. That is, the multiple content functionality application 1920 may be operative to provide all software functionality needed for generating, editing and displaying multiple content types in a single document or content item as described herein. For example, the multiple content functionality application 1920 may provide for entry and edit of text-based content, for example, the content 105 illustrated in FIG. 1. The application 1920 may be likewise be operative for entering, editing, and displaying spreadsheet application content, slide presentation application content, Internet-based content, contacts application content, calendaring application content, notes application content, or any other application content that may be useful for entering and displaying in a given document or other content item, as described herein.

Alternatively, the multiple content functionality application 1920 may be operative to call each of these types of software applications for obtaining functionality from such applications when content associated with such applications is received by, entered into, displayed with, or otherwise associated with content of another type. For example, if a word processing-type document, for example, a letter or memorandum receives a spreadsheet application chart or other object between two paragraphs of the example word processing document, the multiple content functionality application 1920 may be operative for providing both software application functionality associated with the word processing-type document or content and functionality required for entering, editing, displaying, or otherwise utilizing the spreadsheet application chart or object.

The multiple content functionality application 1920 may be operative for calling each of these disparate software applications for obtaining the functionality required under the circumstances. For example, if the user is utilizing a word processing application for entering and editing a word processing document, and the user inserts a spreadsheet application object (e.g., chart) into the word processing document, the multiple content functionality application 1920 may be operative for calling the spreadsheet application via an application programming interface to request functionality from the spreadsheet application such that when a user subsequently interacts with the spreadsheet application object that has been inserted into the word processing document, functionality from the associated software application will be available for use in editing or otherwise manipulating the software application object that has been inserted into the word processing document or content item.

Referring still to FIG. 1, navigation components 115 are illustrated for navigating from one page of displayed content to another page of displayed content. For example, selection of the lower right hand navigation component 115 may be used for navigating in a forward direction from a first displayed page to a second displayed page, and the left hand navigation component 115 may be used for navigating from a first displayed page to a previously displayed page.

A navigation component 120 is illustrative of a light weight navigation component that may travel with a displayed document as the displayed document is navigated by a user. For example, as the displayed document illustrative in FIG. 1 is moved up, down, right or left, the navigation component 120 may remain disposed over the displayed document in the location and orientation, illustrated in FIG. 1. As should be appreciated, the navigation component 120 may be disposed in other locations on a displayed document, as desired. Referring to the navigation component 120, a number of navigation buttons or controls 125, 130, 135, 140, 145 are provided for allowing navigation through a document in a non-linear way. That is, typical document navigation includes movement of a cursor to a specific location in a document by scrolling/moving the cursor up, down, right or left, or by moving a navigation bar operative for moving the document up, down, right or left. According to embodiments, the navigation component 120 allows for navigation of the document in any direction and allows for movement of the document, for example, rotation of the document for viewing content contained in the document according to different display orientations. For example, the control 125 may be used for moving to the right, the control 130 may be used for moving to the left, the control 135 may be used for moving upward, the control 140 may be used for moving downward, and the control 145 may be used for rotating the content illustrated in the document into a variety of rotated orientations.

In addition, the navigation component 120 allows for zoom in/zoom out navigation of content items (e.g., documents). According to embodiments, zoom in/zoom out may include traditional optical zoom where a display of a given portion of content is brought closer or is moved away from view. In addition zoom in/zoom out may include semantic zooming. For example, semantic zooming on the chart 110, illustrated in FIG. 1, may allow a user to view a spreadsheet from which the chart object is built.

Figure 2:
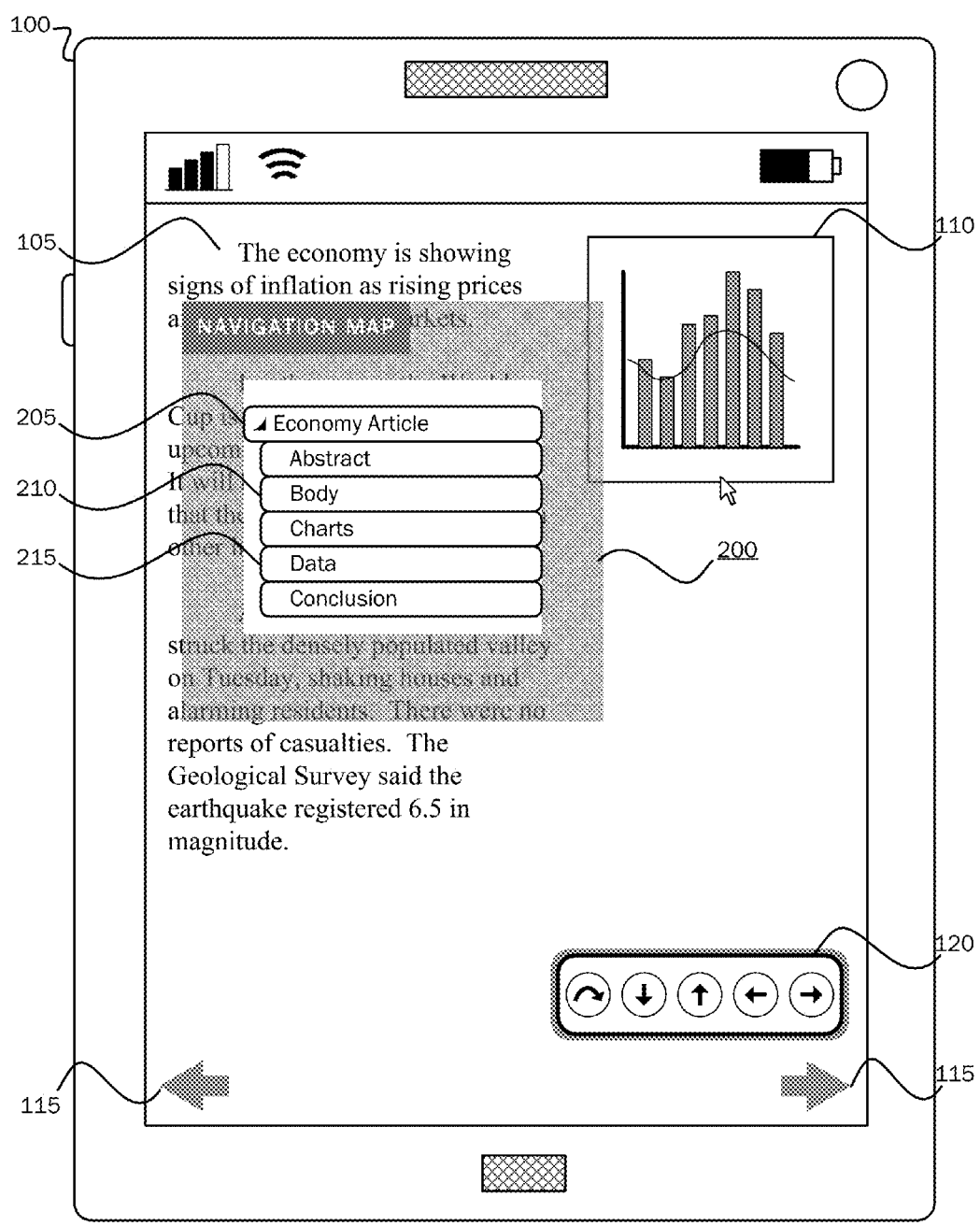
FIG. 2 is a simplified block diagram illustrating a computer-generated display on which is displayed document content and one or more means for navigating the document content.

Referring now to FIG. 2, an alternate navigation means for navigating through a document or other content item is illustrated and described. A navigation map 200 is illustrated for displaying a mapping of portions of content items contained in or associated with a given computer-enabled document. As illustrated in FIG. 2, the navigation map includes a semi-transparent section bordering a listing of components of a document or other content item for which the navigation map 200 may be used for navigating through the document or content item. For example, the navigation map illustrated in FIG. 2 includes sections or components of a document 105, and selection of the listed components may be used for automatically navigating to the various components. For example, the navigation map 200 illustrated in FIG. 2 shows example document components of "Economy Article" 205 (e.g., a title of a displayed document), "Abstract," "Body" 210, "Charts," "Data" 215 and "Conclusion." As should be appreciated, the components 205, 210, 215 illustrated in the navigation map 200 are for purposes of example only and are not limiting of the vast number of document components sections or associations that may be listed in a given navigation map 200. In addition, the user interface components illustrated herein are likewise for purposes of example only and are not limiting of various UI components and configurations that may be used. For example, the navigation map 200 could appear in a dedicated pane with or without the use of transparency, as illustrated in FIG. 2.

According to embodiments, selection of one of the listed components in the navigation map 200 may allow for automatic navigation to and display of the selected component. For example, selection of the "Economy Article" title 205 may cause navigation to the title of a displayed document. Likewise, selection of the "Abstract" component may allow for navigation to a paragraph or other section of the example document titled "Abstract." Selection of the "Charts" component from the navigation map 200 may cause navigation to the first of a number of charts or other chart-type objects contained in the example document.

If a component type listed in the navigation map 200 is associated with a number of components of that type, selection of that component type from the navigation map 200 may cause a display of all those components associated with that component type. For example, if a document 105 is being edited, and the document 105 includes spreadsheet application charts 110 disbursed throughout the document, selection of the "Charts" component from the navigation map 200 may cause a navigation to the first of the numerous charts contained in the document, and subsequent selection of the "Charts" component type may cause navigation to the second of the charts contained in the document, and so on. Alternatively, selection of the "Charts" component from the navigation map 200 may cause a display of all charts contained in the document 105 to allow the user a quick view of all charts or chart-like objects contained in the document. As should be appreciated, such navigation map components may be available for other document components/objects. For example, if a given document included a number of photographs, then a navigation map component of "Photographs" may be provided in the navigation map 200 to allow the user to quickly navigate to photographs included in the document either one at a time, or as a collection of photographs.

Figure 3:
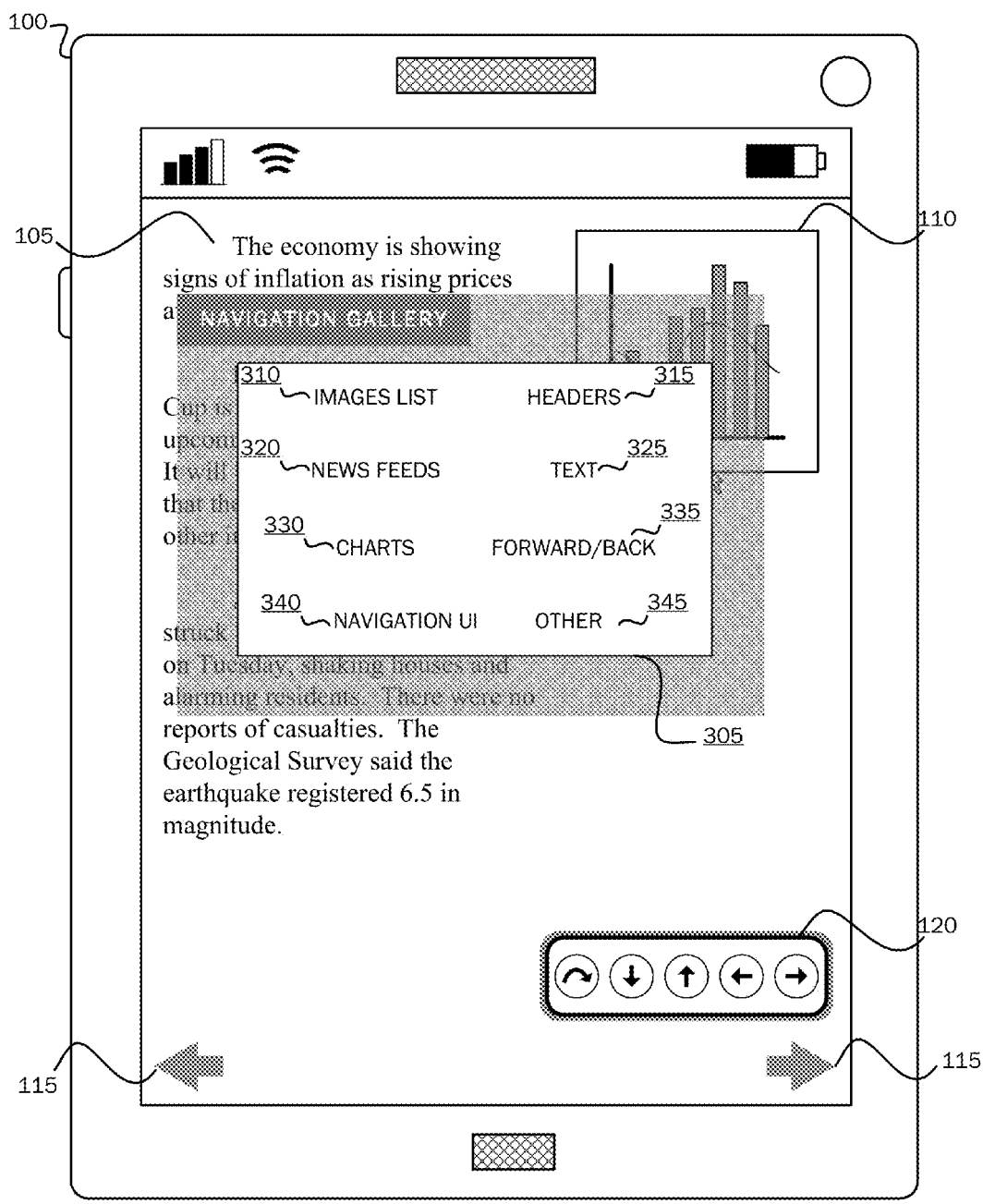
FIG. 3 is a simplified block diagram illustrating a computer-generated display on which is displayed document content and one or more means for navigating the document content.

Referring now to FIG. 3, another navigation means for navigating through a given document in a non-linear way is illustrated and described. As illustrated in FIG. 3, a navigation gallery 305 is displayed over the document 105 and chart 110. According to one embodiment, the gallery 305 may include a collection of different visuals to navigate the document, for example, a gallery of user interface (UI) choices. For example, the gallery 305 may include one or more different ways to visualize the navigation of the document, such as a navigation bar on the left of the document, a table of contents in the middle of the document, a geographic map where different states let you navigate to information about each state, and the like. According to other embodiments, the navigation gallery 305 may include a selectable listing of one or more components of a displayed content item including links to associated content items, data, remotely located/operated information sources, and the like. As should be appreciated, the listings illustrated in the navigation gallery 305 are for purposes of illustration only and are not exhaustive of the listings of various components or linked content or resources that may be displayed in the navigation gallery 305 for selection by a user in navigating through a document and to content and resources associated with the document in a non-linear manner.

Referring to the navigation gallery 305, an "Images" list 310 is illustrated, a "Headers" component 315 is illustrated, "News Feeds" 320 is illustrated, "Text" 325 is illustrated, "Charts" 330 is illustrated, "Forward/Back" navigation 335 is illustrated, a Navigation UI 340, and "Other" components or associations 345 are illustrated. According to embodiments, selection of any of the listed components or associations in the navigation gallery 305 may cause navigation to selected components in the displayed document 105, or may cause navigation outside the document to linked or associated content. For example, an "Images" list 310 may be selected for navigating to images, for example, photographs, clip art, and the like that may be included in a given document 105. For example, if the user wishes to edit all images contained in a given document, selection of the "Images" list 310 from the navigation gallery 305 may allow the user to navigate to each document-contained image one at a time, or the user may be provided an editable display of all images contained in the document 105 to allow the user to review and edit the images, as desired.

Selection of the "Headers" listing 315 likewise may allow the user to navigate to each header contained in a given document one at a time, or the user may receive a listing of headers contained in a document in an outline or bullet format or other suitable format to allow the user to review and/or edit headers contained in the document. Selection of the "Text" component 325 may allow the user to navigate through various portions of text contained in a document, selection of the "Charts" component may be allow the user to navigate to one or more charts contained in the document, and selection of the "Forward/Back" listing 335 may allow the user to navigate in a forward or back orientation of the document, as desired. Another similar listing not illustrated may be a "Zoom" listing that may allow both content zooming and semantic zooming as described above with reference to FIG. 1.

Selection of the "News Feeds" listing 320 is an example of a navigation means for navigating to linked content or resources otherwise associated with the document. For example, an item such as "Links" may be provided to allow the user to navigate to any content or resources links contained in a given document either one at a time, or may allow a user to navigate to a listing of all links. Likewise, selection of the "News "Feeds" listing 320 may allow the user to navigate to news feed links contained in a document, navigate to a collection of news feeds links contained in a document, or selection of the "News Feeds" listing 320 may allow a user to navigate to an outside resource, for example, an Internet-based news service that contains information linked to or otherwise associated with the document 105.

The Navigation UI 340 is illustrative of one or more of a collection of different visuals to navigate the document, for example, a gallery of user interfaces (UI) choices, as described above. The "Other" 345 listing may be associated with a variety of other categories of content. For example, these listings may include such content categories as stock prices, maps, research content, author biographical information, and the like. Selection of these types of content items may cause navigation to content and resources available through one or more third party or external sources which may be linked to the present document as described above.

Figure 4A:
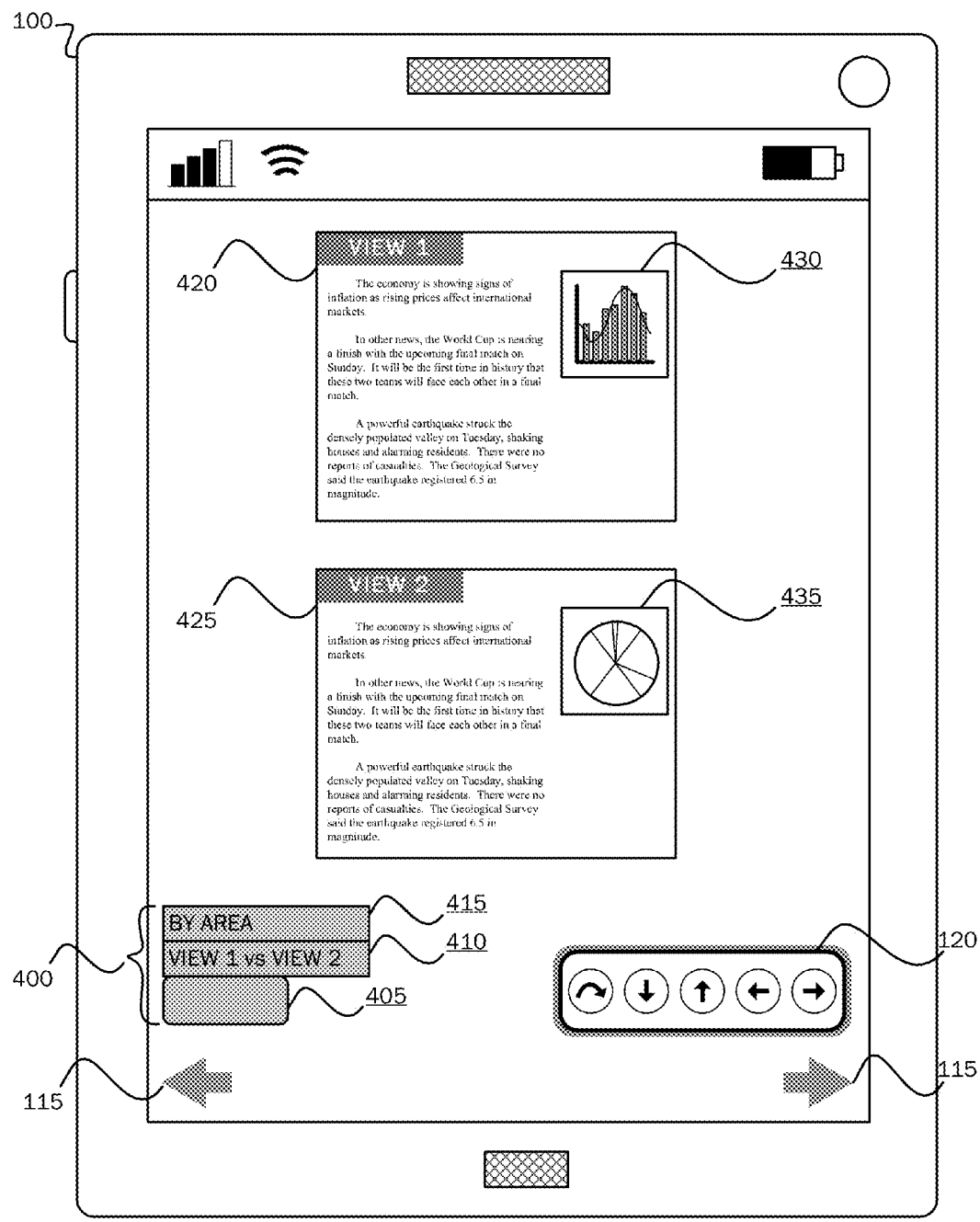
FIG. 4A is a simplified block diagram of a computer-generated display showing a view of content of a document structured in one manner versus a view of the content of the document structured in a different manner.

Referring now to FIG. 4A, according to an embodiment, a navigation component 405 may be displayed for allowing navigation between various versions and/or views of a given document or other content item and for allowing navigation of a document by document area or section. For example, selection of the navigation component 405 may cause display of a "View 1 vs View 2" navigation component 410, a "By Area" navigation component 415, and the like. As should be appreciated, the components 410, 415 are illustrated for purposes of example only, and are not limiting of other types of navigation components that may be provided for allowing navigation between two or more versions of a given document or content item or for navigating a given content item according to areas or components of the content item.

For example, selection of the "View 1 vs View 2" component 410 may cause a display for review by a user of a first view of a given document 425 and a display of a second view of the document 420 to allow the user a quick review of differences between the two views. For example, a user may be working in a collaborative workspace in which multiple users are responsible for editing a set of documents. A first view 420 of the document may have been generated by one user having a bar graph 430 illustrating a set of data, and a second view 425 of the same document content and data may have been generated by another user having a pie chart 435 illustrating the same set of data. By selection of the "View 1 vs View 2" user interface component 410, the user may see a display of the two views to allow the user to decide which view he/she prefers. For another example, a first few may show document content items ordered alphabetically, and a second view may show the same document content items ordered by importance levels applied to each content item.

Figure 4B:
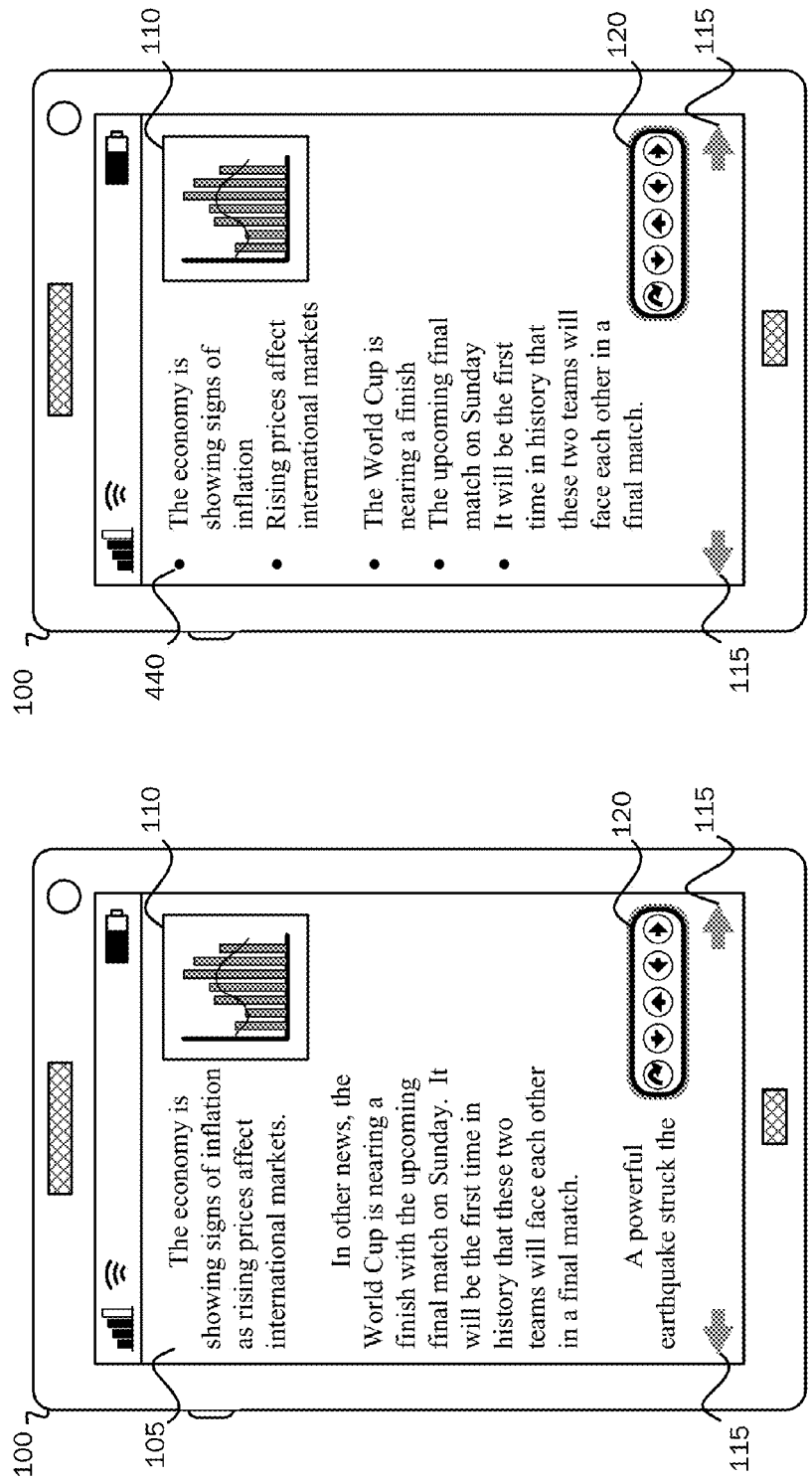
FIG. 4B is a simplified block diagram illustrating application of one or more functionalities, including formatting, to an example document content item across multiple document content portions.

Referring to FIG. 4B, according to embodiments, documents or other content items displayed by the application 1920 may be formatted according to a variety of formats for providing different views to a requesting user. As illustrated in FIG. 4B, a document 105 is illustrated in a standard indented paragraph structure as might be used in a letter or memorandum. Upon command, the formatting of the document 105 may be automatically changed to a different format, for example, the bullet list format, illustrated in the document version 440 displayed on the computing device 100. Such a display of the two formatting versions of the document 105 may be accomplished by the navigation component 405 illustrated and described with reference to FIG. 4A upon selection of an appropriate "Version 1 vs Version 2" type of navigation function in the same manner as described above with reference to FIG. 4A.

According to embodiments, the differences between the two views 105 and 440, illustrated in FIG. 4B are more than just the addition of bullet points to the second view. That is, changes in the text, links between portions of the text to various sources, and the like may have to change in order to produce the second view 440 of the document versus the first view 105.

Referring back to FIG. 4A, the "By Area" component 415 may allow a user to navigate a given document 105 by document components, areas or sections. For example, a given document 105, as illustrated in FIGS. 1-3, may contain a variety of rich components, for example, text, images, charts, photographs, inserted Internet-based web pages, and the like. According to one embodiment, the focus of the "By Area" navigation is to allow navigation based on content as opposed to content types (e.g., images, charts, photos, etc.) where the navigation is based on the content associated with those types as opposed to navigation based on types. Selection of the "By Area" component 415 may allow for a listing of the areas or components of a given document, for example, via the navigation map 200 illustrated with respect to FIG. 2, or the navigation gallery illustrated with respect to FIG. 3, for allowing the user to navigate a given document by area or component of the given document. Alternatively, selection of the "By Area" component 415 may allow non-linear navigation through the document 105 on an area-by-area, component-by-component, section-by-section, and so on. For example, if the user chooses to navigate the document 105 by imbedded photographs, the "By Area" navigation function may allow for navigation of the document on a photograph-by-photograph basis.

According to embodiments, the multiple content functionality application 1920 and/or associated software applications from which the application 1920 obtains functionality may be utilized for providing a variety of views of displayed document and/or other content items. According to one embodiment, "heat map" views of documents may be generated where different views show or highlight subsets of document portions fitting a particular attribute. That is, different views may show only those portions or highlight only those portions of a document fitting a particular attribute. For example, one view may show only those portions of a document or may highlight only those portions read by one or more users. Another view may show only those portions of a document or may highlight only those portions liked or disliked by one or more users. Another view may show only those portions of a document or may highlight only those portions commented on by one or more users. Another view may show only those portions of a document or may highlight only those portions marked for interest by one or more users. Marking a portion of a document for interest may include annotating a portion of a document to show that a given user is interested in the portion which may be valuable information for subsequent users or reviewers of the document.

Figure 5:
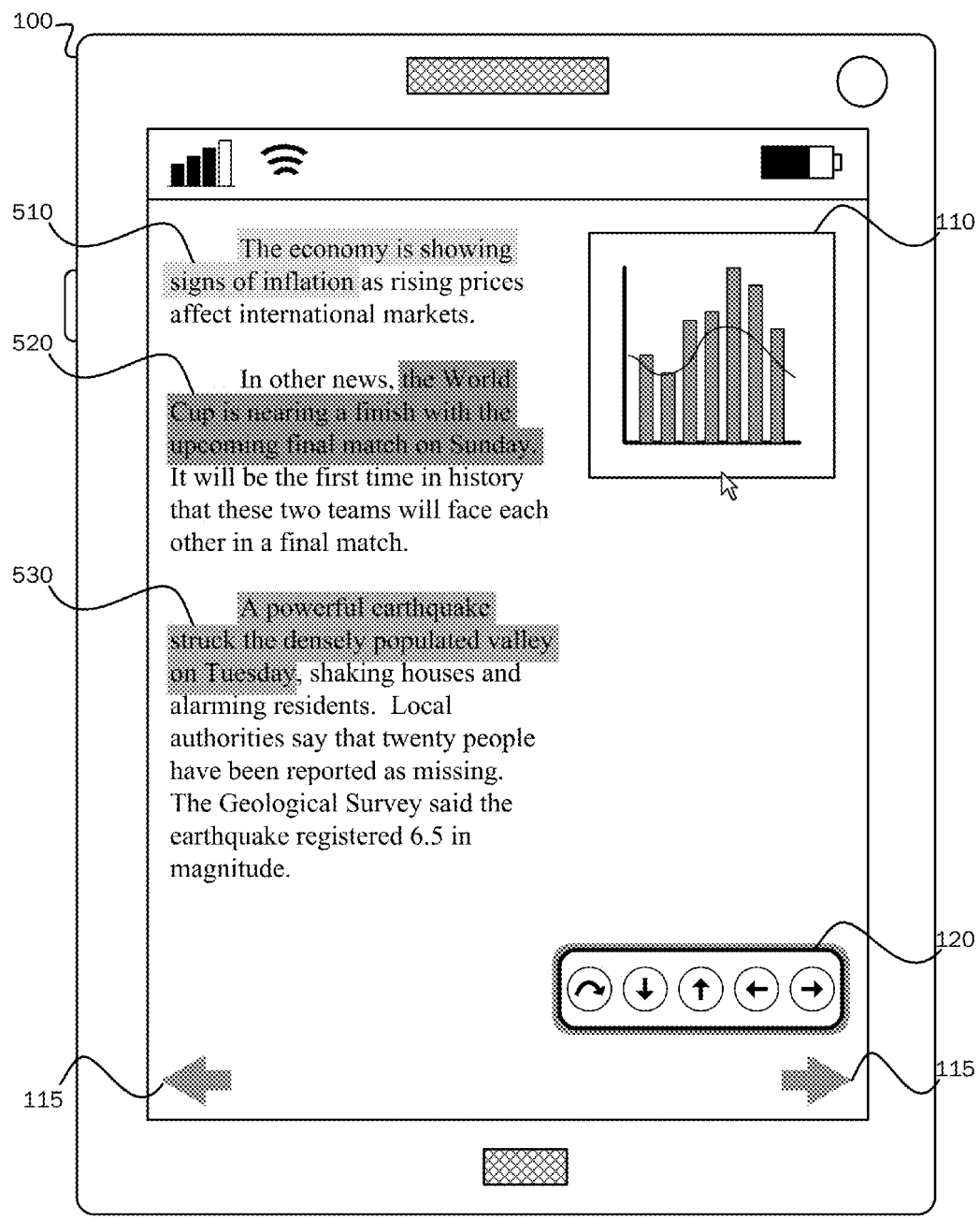
FIG. 5 is a simplified block diagram illustrating a computer-generated display showing highlighted content portions associated with content items viewed by various users.

Referring to FIG. 5, one view that may be provided includes a highlighting of content viewed, reviewed, edited or otherwise interacted with by a given user having access to the document or content item. According to embodiments, interaction with content may not require edits or comments on the content, but may include simply viewing the content for a period of time. For example, it may be important to one or more users to know who has viewed one or more portions of a content item and how long they spent viewing those portions in addition to knowing whether edits or comments were made with respect to those portions.

As illustrated in FIG. 5, the document 105 includes a first highlighting 510, a second highlighting 520, and a third highlighting 530. The first highlighting 510 is illustrative of a highlighting that may be applied to one or more sections or components of a given document 105 that previously have been reviewed, edited, or otherwise interacted with by a given user. For example, if the document 105 is a document that is accessible to a variety of users working in a collaborative workspace, the document may be opened, reviewed, edited, or otherwise utilized by a number of different users. A first user may open the document and may edit five different paragraphs of the document before saving the document back to a storage medium accessible by other users working in the example collaborative workspace. Subsequently, when the document is opened, other users having access to the document may cause a highlighting 510 to be applied to all sections of the document that were edited or otherwise interacted with by the previous user when the previous user accessed the document. Thus, the previous user, or other users having access to the document may quickly review those components or portions of the document possibly affected by the previous user's access to the document. For another example, as set out above, the highlighting may show that the first user simply opened the document and viewed various portions for various periods of time which may be important to other users involved in preparing or editing the document.

The second highlighting 520 is illustrative of a highlighting that may be associated with components or portions of the document edited by a second user, and the third highlighting 530 is illustrative of a highlighting that may be applied to components or portions of the document edited or interacted with by a third user, and so on. According to embodiments, content that may be highlighted, as illustrated in FIG. 5, may include words, sentences, paragraphs, sections, or other identifiable portions or components of a document receiving edits, manipulation, or navigation by a given user. For example, if a given user changes a word in a given sentence, then the sentence, paragraph in which it is included, or section in which it is included may be highlighted to show that the word, sentence, paragraph, section, or the like has been affected by the user's access to the document. In addition to editing, simple navigation in a portion of a document may likewise cause a highlighting of the portion. For example, if a user accesses the document and moves a mouse cursor through a given portion of the document or focuses a mouse cursor or other input means on a portion of the document, then that portion in which the user navigated may be highlighted, as illustrated in FIG. 5.

As described above, highlighting of portions or components of a document may be utilized to show those portions reviewed, edited, or otherwise interacted with by one or more users. According to other embodiments, other means may be employed for highlighting potentially affected content. For example, portions of the document accessed by a given user may be displayed, while all other portions of the document may be "grayed out" so that only those portions accessed by a given user may be legible for showing those portions that were accessed and potentially edited by a given user. As should be appreciated, one display of the document may show only those portions accessed by one user, another display of the document may show only those portions accessed by a second user, and another display of the document may show those portions accessed by a third user, and so on. Alternatively, a single display of the document, as illustrated in FIG. 5, may show just those portions accessed by various users, wherein the highlighting for accessed portions may be customized for each accessing user (e.g., different highlighting color for different users) to distinguish those portions accessed by one user from those portions of the document accessed by another user. And, as discussed above, accessing a given portion of the document may include viewing the portion for a period of time as evidenced by a display of the portion for an extended period of time, a mouse focus on the portion for an extended period of time, and the like.

Figure 6:
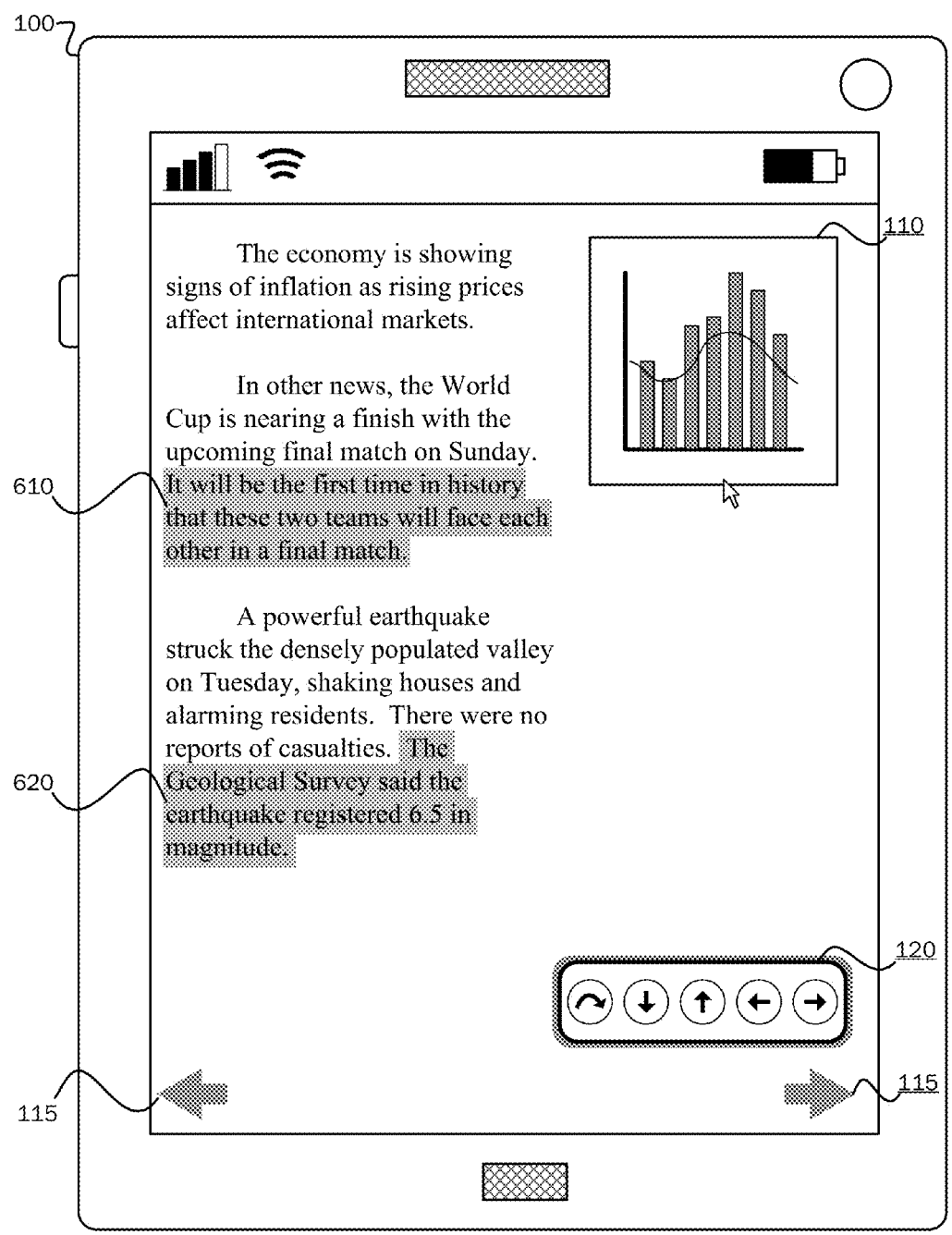
FIG. 6 is a simplified block diagram illustrating a computer-generated display showing highlighted content portions associated with content items not reviewed by one or more users.

Referring to FIG. 6, highlighting 610, 620 is illustrated showing portions or components of a displayed document that have not been accessed, for example, reviewed, edited, or otherwise interacted with by one or more users having access to the subject document or content item. That is, the highlighting 610, 620 may show any user having access to the document those portions of the document that have not been accessed by one or more other users having access to the document so that a given user having access to the document may quickly review any portions that have not been reviewed to determine whether those portions may require editing or other manipulation.

Figure 7:
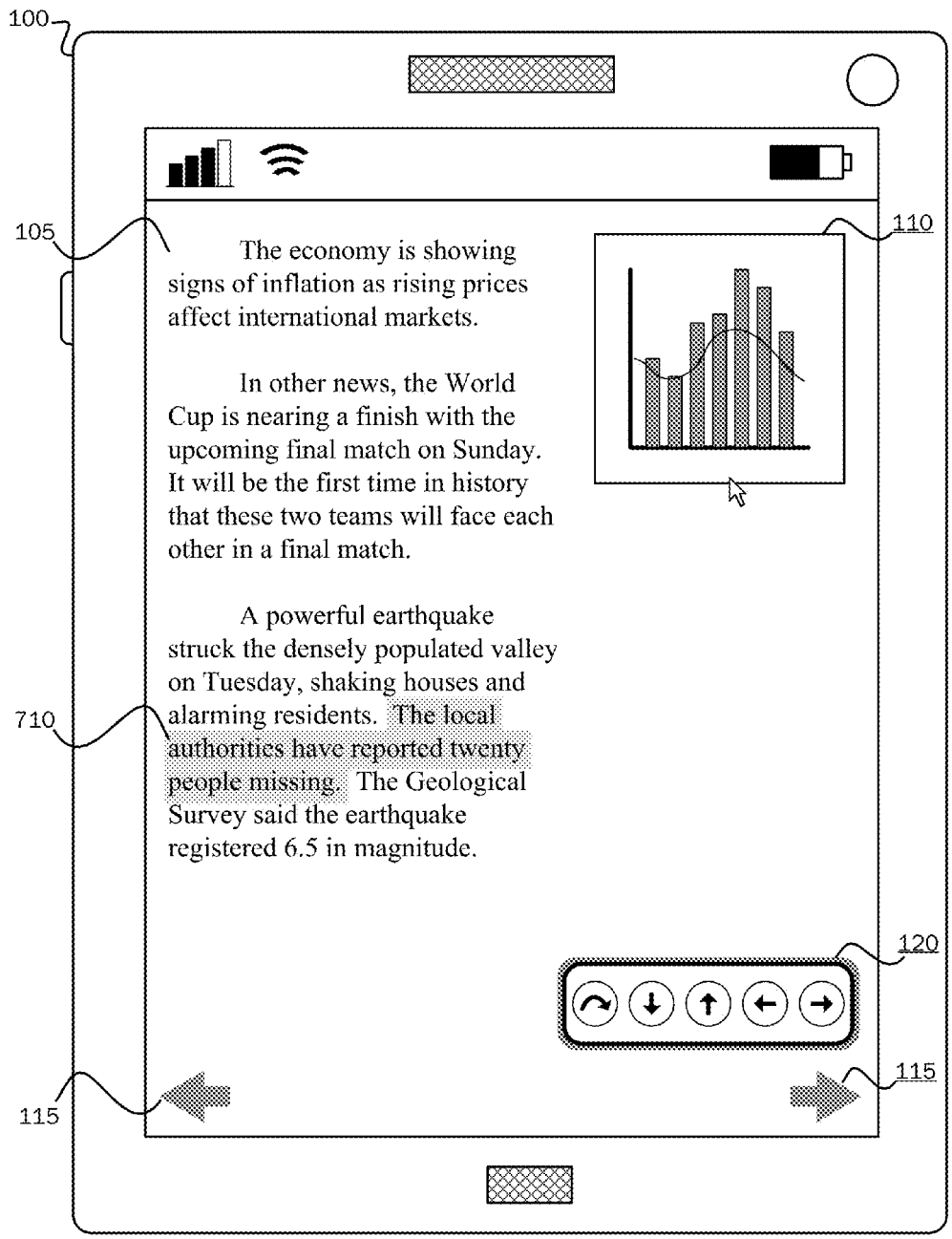
FIG. 7 is simplified block diagram illustrating a computer-generated display showing highlighted content portions associated with content items that have changed since being reviewed by one or more users.

Referring to FIG. 7, a highlighting 710 is illustrated for showing users having access to the document 105 those portions of the document that have changed since last access to the document 105. That is, the highlighting 710 may quickly expose any content or portions of content contained in the document 105 that have been revised by one or more other users having access to the document. As should be appreciated, the highlighting illustrated and described with reference to FIGS. 5, 6 and 7 may be applied to non-text portions of a given document or content item. For example, if a chart, image or other object contained in a given document or content item has been accessed, not accessed, or changed or otherwise revised or altered, such content types likewise may be highlighted to indicate the type of access associated with each content type. According to embodiments, the highlighting 710 may be performed automatically without user action as would be required to activate a "track changes" feature for showing changes to the document since a last access of the document.

Figure 8:
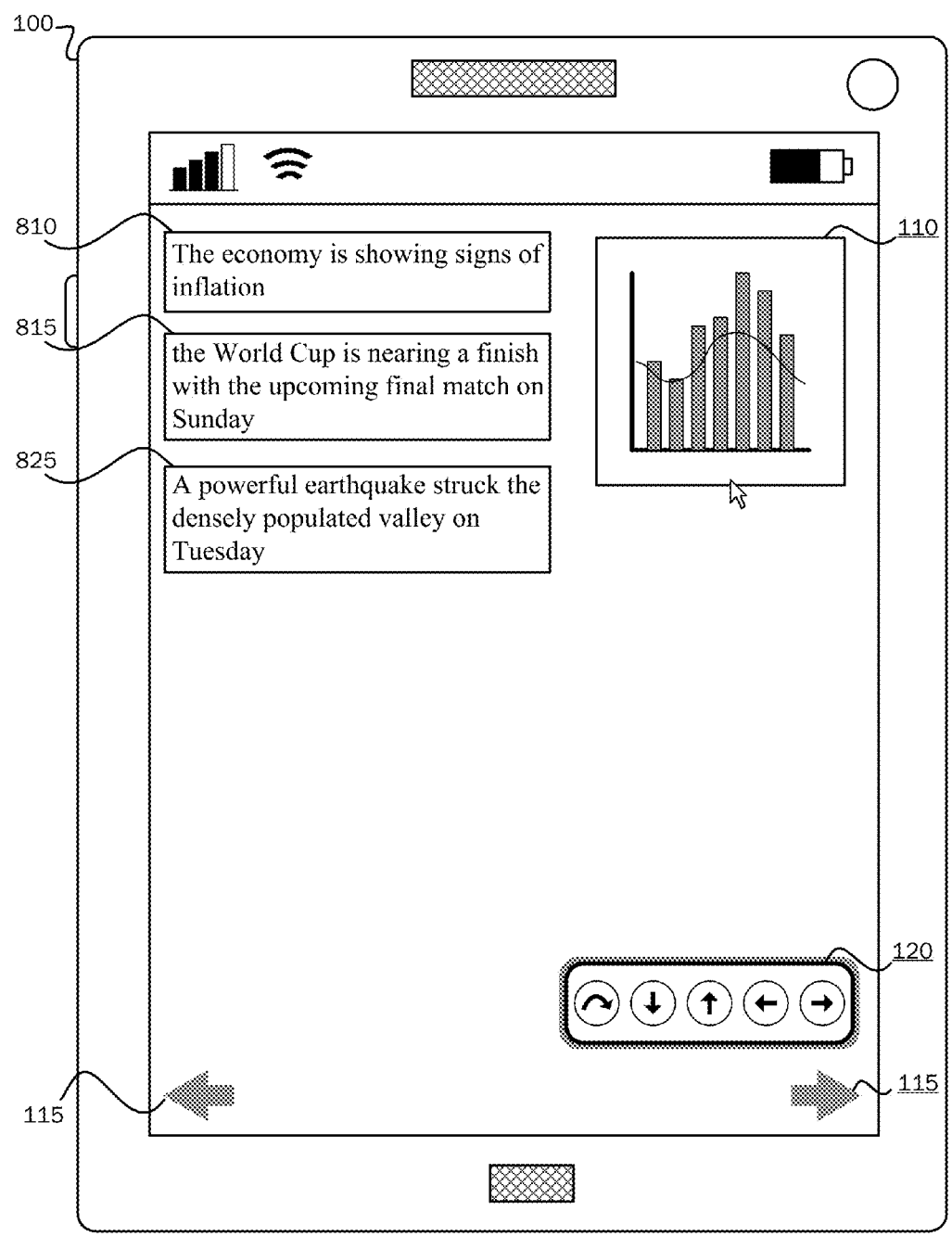
FIG. 8 is simplified block diagram illustrating a computer-generated display showing a document comprised of portions of another document reviewed and/or edited or not reviewed by one or more users.

Referring to FIG. 8, components or portions of a given document or content item that have been accessed, not accessed, or edited may be displayed together in a single document to provide a user a quick review of components or portions of a document that have been reviewed by one or more users, not reviewed by one or more users or revised by one or more users. For example, a user may desire to see a document containing only those portions of a given document he/she has previously reviewed, or he/she may desire to see a document containing only those components or portions previously reviewed by one or more other users.

As illustrated in FIG. 8, each of the displayed components may be provided in sequential order, or may be provided according to a variety of other orders or orientations, as desired. For example, portions or components 810, 815, 825 may be displayed in the order in which they occur in a given document, or those portions or components may be displayed according to the order in which they were accessed or revised, or the portions may be ordered in association with users who accessed and/or revised the displayed portions. For example, all portions accessed and/or revised by a first user may be displayed together, all portions accessed and/or revised by a second user may be displayed together, and so on.

In addition, portions may be ordered based on a variety of attributes associated with the content or associated with users accessing the content. For example, portions may be ordered based on how many comments have been applied to the various portions, or portions may be ordered based on hierarchy of the users commenting on various portions (e.g., portions accessed by executives first, portions accessed by managers second, and so on). As should be appreciated portions or components of a content item may be ordered based on almost a limitless number of ordering attributes that may be associated with the various portions or components.

As should be appreciated, the display of components or portions of a document illustrated in FIG. 8 is not limited to text portions or components, but may include a display of other objects, for examples, charts, images, and the like that have been accessed and/or revised or otherwise interacted with by one or more users. By way of example, the text components 810, 815, 825 correspond to the portions of text 510, 520, 530 reviewed by one or more users and illustrated in FIG. 5.

As described above with reference to FIGS. 1-8, according to embodiments, a document or other content item may contain a variety of components or portions. For example, a word processing document such as a memorandum may include numerous parts and subparts. For example, a memorandum document may include an abstract of the document, an introduction, a body, a data section, a charts section, a conclusion, a bibliography, and the like. In each of such sections, the document may contain one or more subparts, subcomponents or parenthetical portions. For example, the body of a memorandum may include tens or even hundreds of paragraphs. The body may contain a number of images, tables, data components, and the like. In addition, such a document or component may include annotations, for example, user-entered comments, revisions, changes tracking, and the like.

Figure 9:
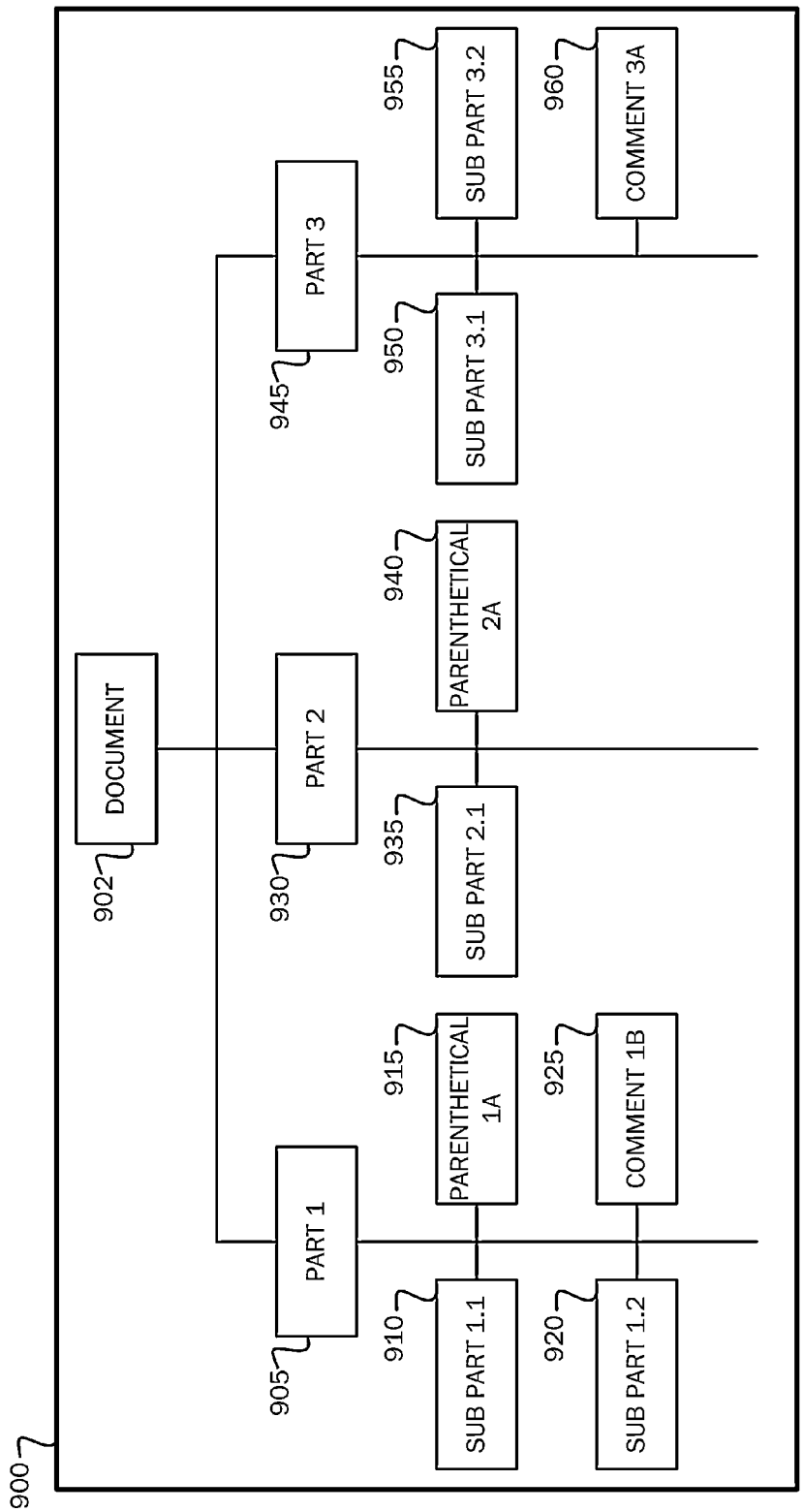
FIG. 9 is a simplified block diagram illustrating a structural mapping of one or more components of a given content item.

Referring to FIG. 9, the multiple content functionality application 1920 may generate a navigable mapping of a document or content item showing components of the document or content item. For purposes of illustration and explanation, FIG. 9 illustrates a document 902, for example, a word processing document, spreadsheet application document, a slide presentation application document and the like, comprised of a variety of parts, subparts and other components. The example document 902 includes three parts 905, 930 and 945. Each of the three parts may correspond to one or more major components of the document, for example, the introduction, body, and conclusion of a document, as described above. For another example, the three parts 905, 930, 945 may include three different sections of a quarterly sales report, wherein a first section includes a word processing document, a second section includes one or more spreadsheet application worksheets or charts, and a third section includes one or more slide presentation slides.

Under each part 905, 930, 945, a mapping of any subparts or components contained within the main part 905 is illustrated. For example, under the part 905 a subpart 902 and a subpart 920 are illustrated beneath the main part 905. A parenthetical 915 is illustrated which may be in the form of parenthetical data or information that may be displayed "in line" or "between the lines" in the part 905 of the document, as described below. A comment 925 is shown beneath the part 905 and is illustrative of one or more user entered comments entered into or associated with the part 905 of the document 902. Second and third parts 930, 940 are illustrated along with various subparts, parenthetical items, comments, and the like. As should be appreciated, one or more subparts, parenthetical items, and comments contained under a given main part 905 may also be structured in a hierarchical order, wherein for example, each subpart 910, 920 may include their own subparts, parenthetical items, comments, and the like. The subparts 910, 920 may include individual paragraphs within a section associated with the first part 905, or the subparts may include such items as data tables, spreadsheets, images, and the like.

The mapping 900 may provide users with a visual representation of the structure of the associated document or content item. According to one embodiment, the mapping 900 is navigable. That is, each representation of each part, subpart, parenthetical, comment, or other component of the document in the mapping 900 may be a selectable functionality control, which when selected allows for navigation to that portion of the associated document. For example, selection of the graphical representation of "Part 1" (905) may allow navigation to that part of the document and followed by display of that part of the document on a display surface of the computing device 100, as illustrated above with reference to FIG. 1.

Similarly, selection of a subpart, for example, "Subpart 1.1" (910) may cause navigation to that portion of the document followed by display of that portion of the document for review by the selecting user. For example, if "Subpart 1.1" (920) is associated with a given spreadsheet application chart embedded in the document 902, a user may first launch the mapping 900 to determine where in the document such spreadsheet components are located relative to each other. After determining which parts, subparts, or others are associated with spreadsheet components, the user then may select one or more of the representations for those components from the mapping 900 in order to navigate to the actual spreadsheet components in the document and to display those components for review, editing, or other manipulation or interaction.

Figure 10:
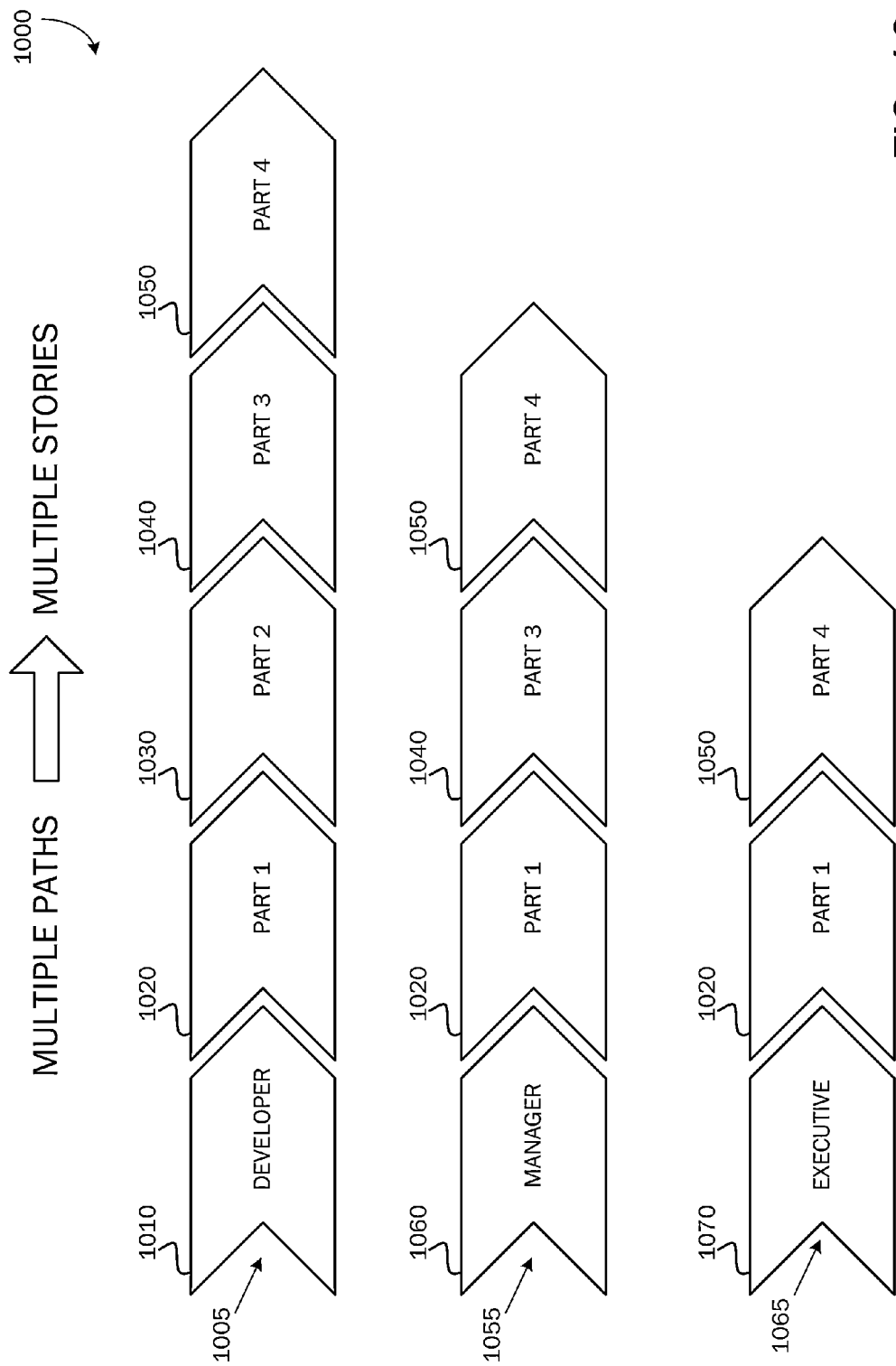
FIG. 10 is a simplified block diagram illustrating structures of different types of documents that may be built from different combinations of document components.

Referring to FIG. 10, an alternative document or content item mapping embodiment is illustrated and described. According to the mapping embodiment illustrated in FIG. 10, components of a given document or content item are illustrated in association with a specified user/reviewer, and the components of the document or content item of interest to the specified user/reviewer are illustrated in the form of a path or story associated with the specified user/reviewer. For example, referring to FIG. 10, consider a document prepared by a software developer in a software development department includes four parts of an abstract, an introduction, a body, and a conclusion. A developer 1010 may desire a version of the document he/she has created containing each of the parts 1020, 1030, 1040, 1050 associated with the document. On the other hand, the software developer's manager 1060 may desire a shortened version of the document that includes only the abstract 1020, the body 1040 and the conclusion 1050. Finally, an executive 1070 of the software developer's company may want a summary version of the document that contains only the abstract 1020 and the conclusion 1050.

According to embodiments, the paths/stories mapping 1000 illustrated in FIG. 10 may be generated for the example document such that each of the paths may be created and may be associated with the specific users interested in those paths. Thus, the path 1005 generated for the developer 1010 may be associated with his/her desired version of the document, the path 1055 generated for the manager 1060 may be structured for his/her version of the document, the path 1065 generated for the executive 1070 may be structured for his/her version of the document, and so on. According to embodiments, the graphical representations of the paths and of the components of the paths may be navigable. That is, selection of each of the components of the paths may allow navigation to those components for display of those components for review by a given user.

In addition, selection of the component identifying the specified user 1010, 1060, and 1070 may cause a display of each of the components or portions of the document associated with that specified user. For example, selection of the manager component 1060 from the mapping 1000 may cause an automatic display of a document containing only those portions or components of the document associated with that specified user. For example, selection of the manager component 1060 may cause generation and display of a document containing only the abstract 1020, the body 1040, and the conclusion 1050. Likewise, selection of the executive component 1070 may cause automatic generation of a document containing only the abstract 1020 and the conclusion 1050 as desired by the specified user, in this example, the software developer's executive. Alternatively, selection of a particular user component 1010, 1060, 1070 may not be required. For example, if a particular user accesses the mapping 1000, and his/her identity is known as the manager 1060 (e.g., based on log-in credentials), then the "manager" document may be automatically generated having only those components mapped to the manager component 1060. As should be appreciated, the components illustrated in FIG. 10 and the specific users illustrated in FIG. 10 are for purposes of example only and are not limiting of the vast numbers of paths and document component stories that may be generated in association with different users desiring different versions of a given document or content item.

Figure 11:
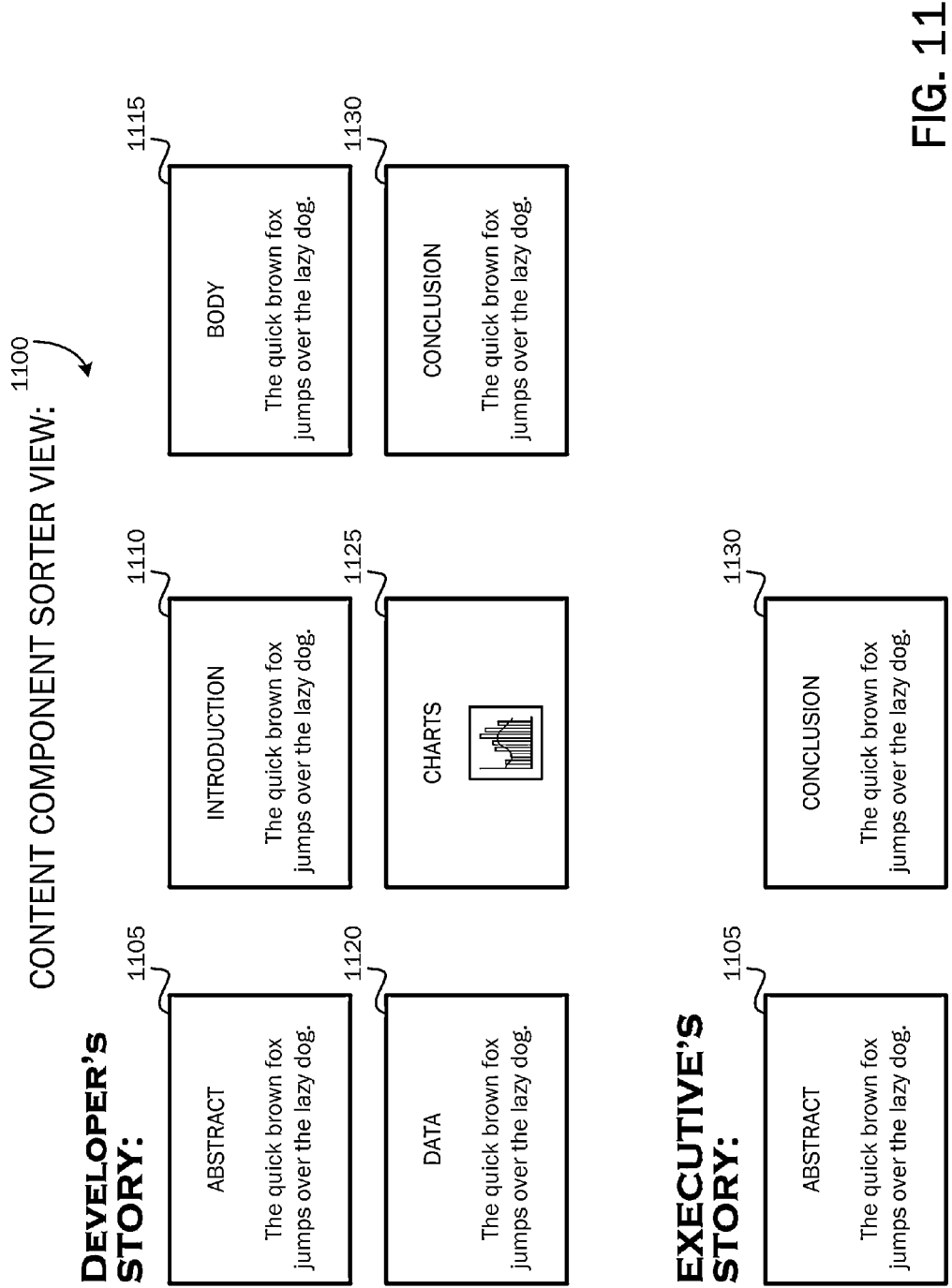
FIG. 11 is a simplified block diagram illustrating visual representations of two different documents that may be built from different combinations of document components.

As illustrated in FIG. 11, a content component sorter view 1100 of the components or portions of a given document is illustrated. According to this view, components 1105, 1110, 1115, 1120, 1125, and 1130 may be illustrated as thumbnail content components in which are shown all or a portion of the text, data, images or other content contained in each of those components or portions of a given document. In a similar manner as described above with reference to FIG. 10, different combinations of the content components may be assembled for specified users or user groups. For example, six content components are illustrated in FIG. 11 including the abstract, the introduction, the body, data, charts, and a conclusion in association with an example "Developer's Story." On the other hand, only two content components including an abstract and a conclusion are assembled and identified as the example "Executive's Story." Each of the assembly of content components may be developed and may be presented to interested users, for example, the software developer, or the software developer's executive manager for review by each user.

According to an embodiment, each content component assembled for each specified user's story may be navigable such that selection of one of the assembled and displayed content components may cause navigation to the corresponding portion of the document followed by display of the corresponding portion of the document for review, edit, manipulation or other interaction by the user. In addition, selection of the overall story, for example, the "Developer's Story" or the "Executive's Story," may cause a display of a document comprised of the portions specified in the associated content components. For example, selection of the example "Executive's Story" view may cause a document to be generated and displayed having only the abstract 1105 and the conclusion 1130.

Figure 12:
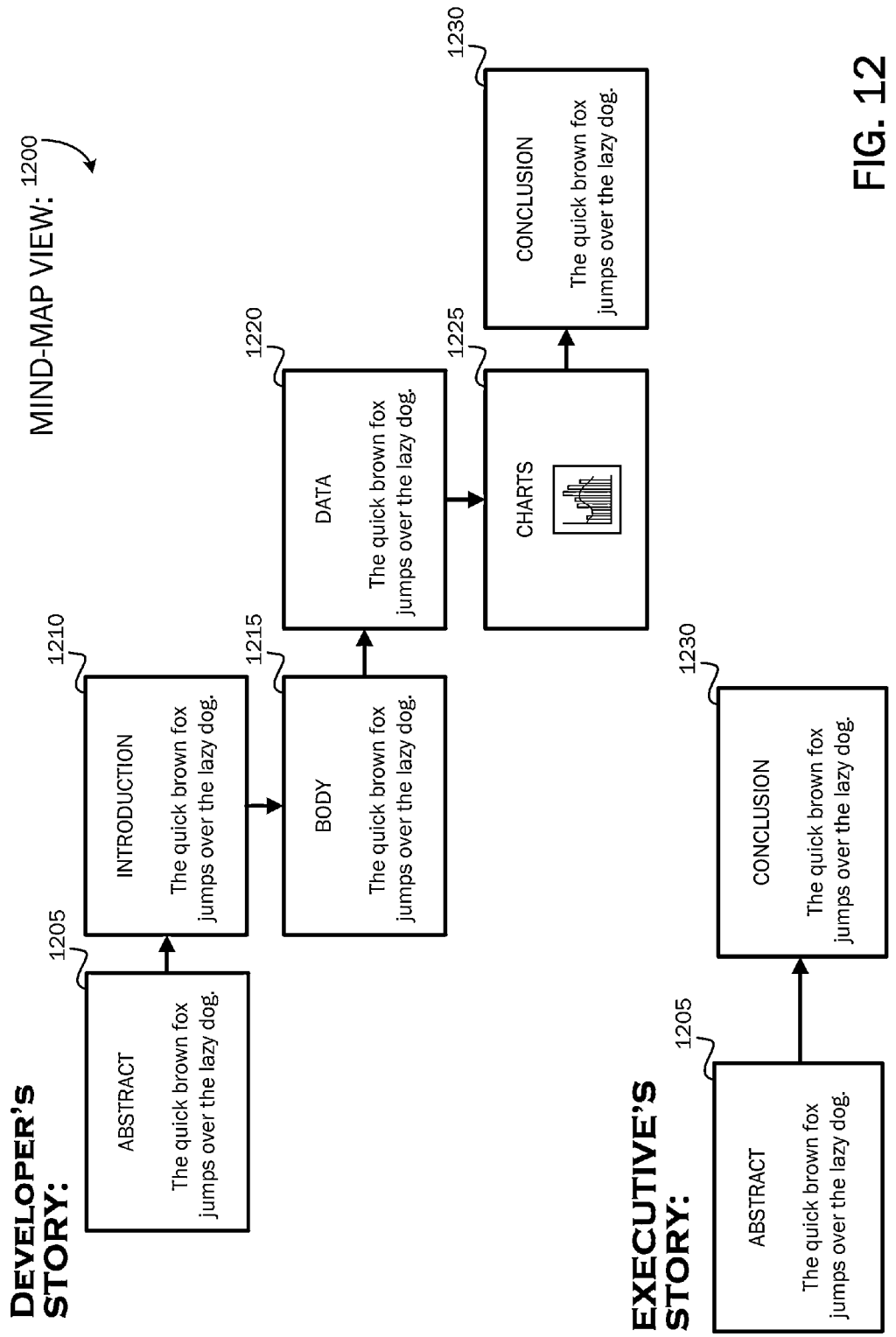
FIG. 12 is a simplified block diagram illustrating visual representations of two different documents that may be built from different combinations of document components.

Referring now to FIG. 12, a mind-map view 1200 is illustrated. In similar manner to the content component sorter view 1100, illustrated above with respect to FIG. 11, the mind-map view is a mapping and display of selectable components or portions of a given document. Each of the selectable components 1205, 1210, 1215, and the like is associated with one or more components or portions of a given document. According to an embodiment, the mind-map view 1200 may illustrate components of a given document in a hierarchical or relational view where the components are organized relative to each other based on a relationship between the components. For example, as illustrated in FIG. 12, the example "Developer's Story" includes an abstract 1205, an introduction 1210, a body 1215, a data section 1220, charts 1225, and a conclusion 1230. The body 1215 is shown beneath the introduction 1210, and the data section 1220 is shown on the same level as the body 1215. Charts 1225 are shown beneath the data section 1220 indicating that the charts may be hierarchically beneath the data section. The conclusion 1230 component is shown to the right of all other sections indicating that it follows from each of the previously identified and mapped component. For the example "Executive's Story," only two components are illustrated, for example, an abstract 1205 and a conclusion 1230. The conclusion 1230 component is shown following from the abstract 1205.

As with the other mappings illustrated above, each of the displayed representations of components of the document or content item may be navigable such that selection of one of the components may cause navigation to and display of the corresponding component of the associated document or content item. Similarly, selection of an identification of the specified user may cause generation and display of a document containing the components mapped in association with the specified user. For example, selection of the example "Executive's Story" identification may cause generation and display of a document containing only the abstract 1205 and conclusion 1230 components of the associated document.

According to embodiments, each of the various content item or document components, illustrated and described with reference to FIGS. 9, 10, 11 and 12, may be mapped relative to each other and may be visually represented owing to metadata applied to those components during document creation, editing or other interaction. For example, some components may be automatically identified and annotated with metadata based on a portion of a document in which they reside. For example, if a document component resides in an "Executive Summary" section of a document, that component may be annotated with metadata identifying it as part of the "Executive Summary" section. For another example, if a document component resides in a "Body" section of a document, then that component may be annotated with metadata identifying it as part of the "Body" section. Such metadata may be annotated based on a structuring language, for example, the Extensible Markup Language, used to structure the document where various portions of the document are tagged with identifying metadata.

Alternatively, various components may be annotated with identifying metadata by user action during the creation, editing or other interaction with the components. For example, if a user is adding a new component to a document, a command such as "new part," "new section," "next parenthetical," "new comment," "next paragraph," and the like may be selected for creating a new document component, and the selection of such a command function may cause annotation of the associated document content such that the associated document content may be identified and isolated for mapping, as illustrated in FIGS. 9, 10, 11 and 12. Other methods may include highlighting a portion of a content item or document, followed by selection of various command functions, such as a formatting functions or other content annotation or manipulation functions. Application of such functions to a given portion of content may allow for annotation of the portion with identifying metadata that may be used for mapping the given portion with portions, as described herein.

In addition, such components may be annotated with identifying metadata and may be mapped based on user interaction with the various document components. Thus, some mappings may be self-created based on user interaction. For example, portions or components of a document viewed by various users may be mapped together as a document mapping and resulting document where a resulting document may include only those portions viewed by the various users. Similarly, portions of documents edited, commented on, read or not read, and the like may be used for generating a document mapping and resulting document. In addition, feedback received for various portions, for example, "like" or "dislike" may be used to generate a document mapping and resulting document where, for example, a document may be generated having only those portions "liked" by its reviewers.

As briefly described above, according to embodiments of the present invention, the multiple content functionality application 1920 may be operative to receive and incorporate content generated in and associated with a variety of software application functionalities into a single document where components of the single documents may be assembled from a variety of other documents or content items, and wherein various components of the document may be operated according to different software functionalities. For example, a given document may be comprised of word processing type components, spreadsheet application type components, slide presentation type components, and the like. And, according to embodiments of the invention, each of those components may continue to enjoy use of an operation in accordance with software functionalities associated with the software applications with which they were generated and from which they were received.

For example, a word processing type document having an embedded spreadsheet application component, such as a worksheet or chart, may operate according to the functionalities of both the word processing application and the spreadsheet application. That is, when a user is focusing on, editing, manipulating, or otherwise interacting with portions of the document associated with the word processing application, the word processing application functionalities will be available to the user for operating on that portion of the document. However, when the user is focusing on, editing, manipulating or otherwise interacting with the example spreadsheet application component embedded in the document, then the functionalities of the spreadsheet application with which that component was generated and from which that component was received will be available to the user for operating on that component.

As described above, according to embodiments, the multiple content functionality application 1920 may be operative to provide each of the functionalities associated with each component contained in a given document or content item by assembling those functionalities from each associated software application when a content item is retrieved from a document having been generated by a given software application, or the multiple content functionality application 1920 may provide various types of functionality by calling the associated software applications, for example, word processing applications, spreadsheet applications, slide presentation applications, each time functionality for an associated component or portion of the application is required. For example, if a user focuses on, edits, manipulates or otherwise interacts with an Internet-based web page embedded in a word processing document, the multiple content functionality application 1920 may be operative to provide Internet browser application functionality, or the application 1920 may be operative to call an Internet browser application to retrieve the needed functionality to allow for the desired interaction with the given web page component.

Figure 13:
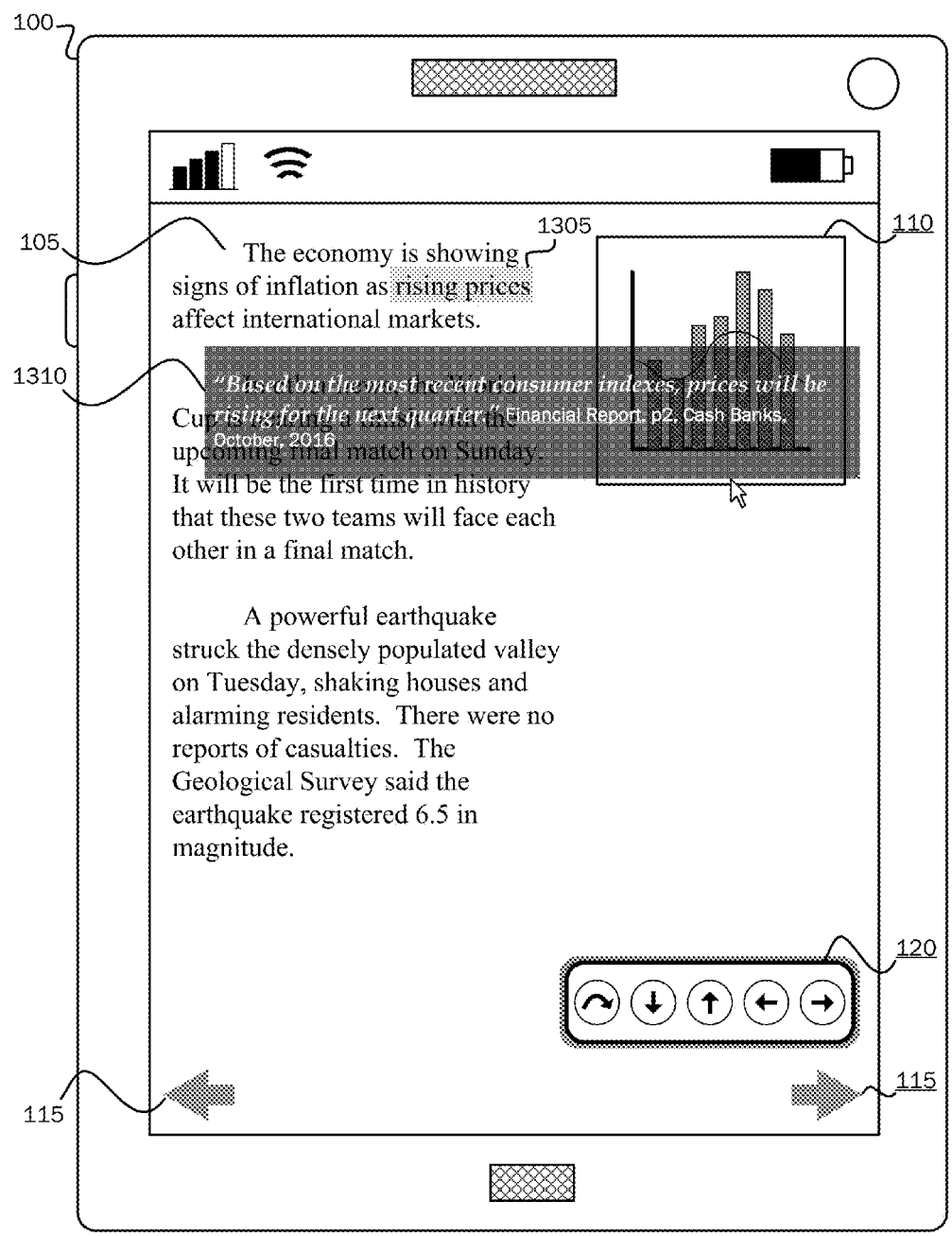
FIG. 13 is simplified block diagram illustrating a computer-generated display showing a document and showing a display of supporting content or information associated with related content or information displayed in the document.

FIGS. 13-17 provide illustrative examples of one or more content items being received into or being associated with a given document or content item for purposes of providing supporting information to the receiving document or content item or for purposes of importing desired additional content into the document or content item. Referring to FIG. 13, an example of importing supporting information for a portion of a document or content item is illustrated. A text phrase "rising prices" 1305 is illustrated in the first paragraph of the document 105 displayed on the display screen of the computing device 100. According to an embodiment, supporting information may be associated with the phrase "rising prices", for example, in the same manner as a footnote in an associated reference may be related to or linked to a quote in a document. According to one embodiment, selection of the example phrase "rising prices" 1305 may cause the multiple content functionality application 1920 to retrieve supporting information from which the phrase "rising prices" was obtained or on which the phrase "rising prices" is based. For example, the phrase "rising prices" may have an associated footnote entered by an author of the author of the document 105. Selection on the footnote associated with the phrase may cause an automatic retrieval by the application 1920 of information from which the phrase was obtained. As should be appreciated, such automatic retrieval may require the creation of a link from the imported information to the source of the information, for example, a link to the example financial report from which the quoted is obtained, as illustrated in FIG. 13.

For example, referring to FIG. 13, a transparent user interface component 1310 including information from which the phrase "rising prices" 1305 was obtained or for which that phrase is supported is displayed over the document 105. Use of the transparent user interface component 1310 is for allowing a viewing of the document information over which the user interface component is displayed if and how to use the displayed information. As should be appreciated, the use of a transparent user interference component 1310 is for purposes of aesthetics and effect and is not limiting of other types of user interface components that may be utilized for providing the example information.

The information illustrated in the user interface component 1310 may be the result of a search on the phrase "rising prices" by the multiple content functionality application 1920 for definitional information for the subject phrase. For example, if a user of the document 105 is interested in knowing whether the paragraph concerning rising prices is accurate, the user may highlight the phrase "rising prices" and pass the highlighted phrase via the application 1920 to a local or remote source for obtaining information on the subject phrase. For example, the subject phrase may be passed to an encyclopedia-type resource for gathering definitional information on the subject phrase. The subject phrase may be passed to a dictionary for obtaining definitions of the terms comprising the phrase, or the phrase may be passed to a remote information site, for example, an Internet-based news service or library for obtaining information on the subject phrase.

Once information responsive to the subject phrase is returned, the information may be displayed in a user interface component, for example, the transparent user interface component 1310 in proximity to the subject phrase, as illustrated in FIG. 13. According to one embodiment, the user interface 1310 and the displayed information may be displayed as a parenthetical display "in line" immediately after the subject phrase, or the user interface component may be inserted between lines in the document immediately after the subject phrase, or in any other orientation to allow a user to review the information retrieved for the subject phrase.

According to one embodiment, the user may review the returned information for informational, definitional, or research purposes, followed by dismissing the displayed information out of view. If the displayed information is dismissed out of view, and the author of the document decides the information is of no value, the author may choose to delete any links to the information. Alternatively, upon command to the multiple content functionality application 1920, the returned information may be inserted into the document at a location desired by the user so that the returned information may be incorporated into the document as desired by the user. If the retrieved information is incorporated into the document 105, then the incorporated information may be treated as a component of the document, for example, a parenthetical component, and the component may then be mapped as a part or subpart of the document, as described above with reference to FIG. 9.

Figure 14:
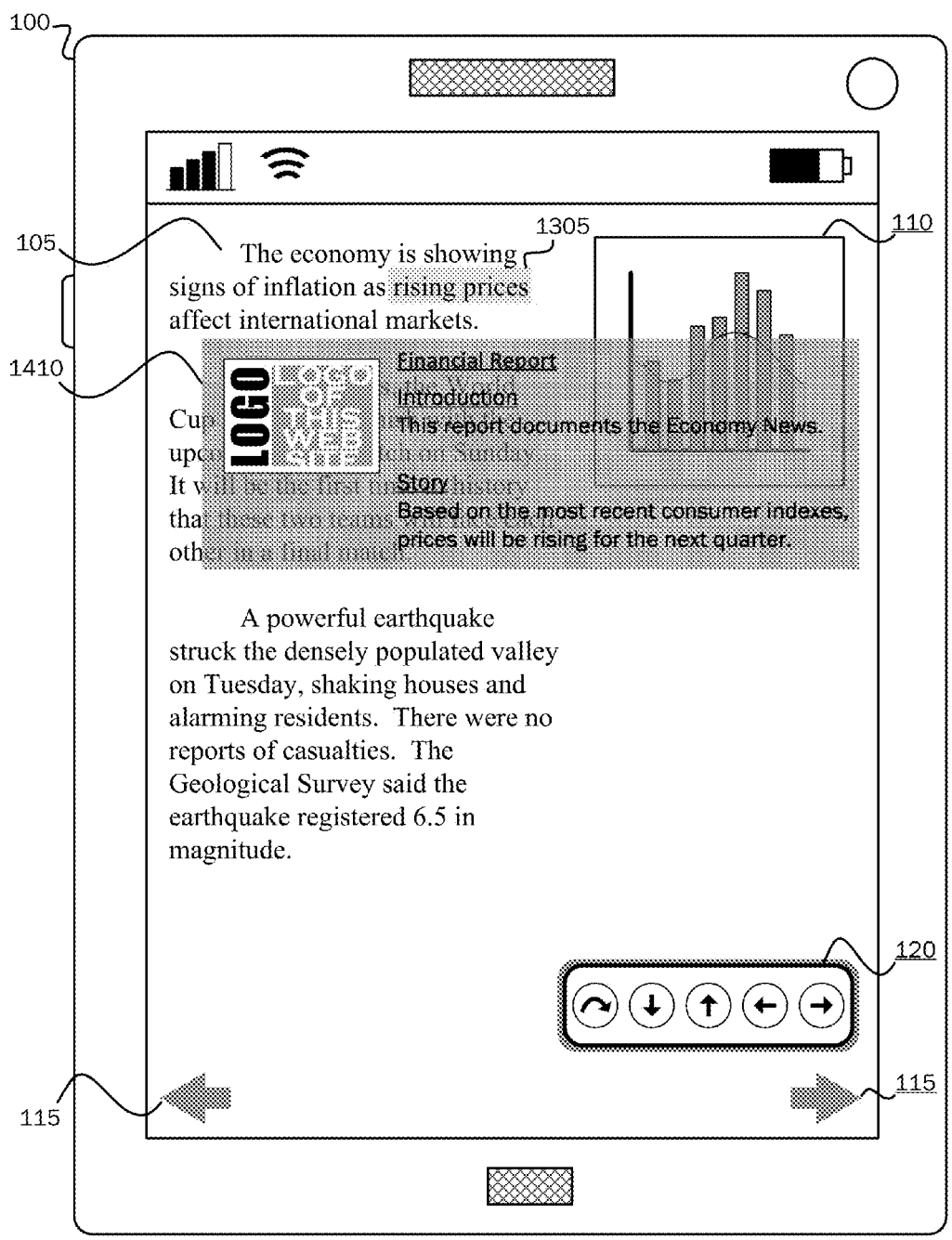
FIG. 14 is simplified block diagram illustrating a computer-generated display showing a document and showing a display of supporting content or information associated with related content or information displayed in the document

Referring to FIG. 14, an example display of Internet-based information in association with a content item is illustrated. As described above with reference to FIG. 13, selection of a given portion of a document or content item, for example, the phrase "rising prices" 1305 may be used for obtaining information on the selected content item from a variety of sources. As illustrated in FIG. 14, the selected phrase "rising prices" has been used for obtaining information from an Internet-based web site/page 1410 associated with the selected phrase. In response, the multiple content functionality application 1920 or the application 1920 in associated with a separate Internet-based web browsing web application has been obtained information from a web site responsive to the associated terms or phrase.

As illustrated in FIG. 14, a transparent user interface component 1410 containing information from the retrieved web site/page is displayed over the document 105 for review by a user. Alternatively, instead of causing the Internet-based search by selecting a particular word of phrase, for example, the phrase 1305, web browsing functionality may be launched by or in association with the application 1920 to allow entry of one or more words or phrases as search terms for obtaining the information from the Internet-based web site/page and for displaying the information in the transparent user interface component 1410. As described above with reference to FIG. 13, use of the transparent user interface component 1410 may allow a viewing of the document information over which the user interface component is displayed.

Figure 15:
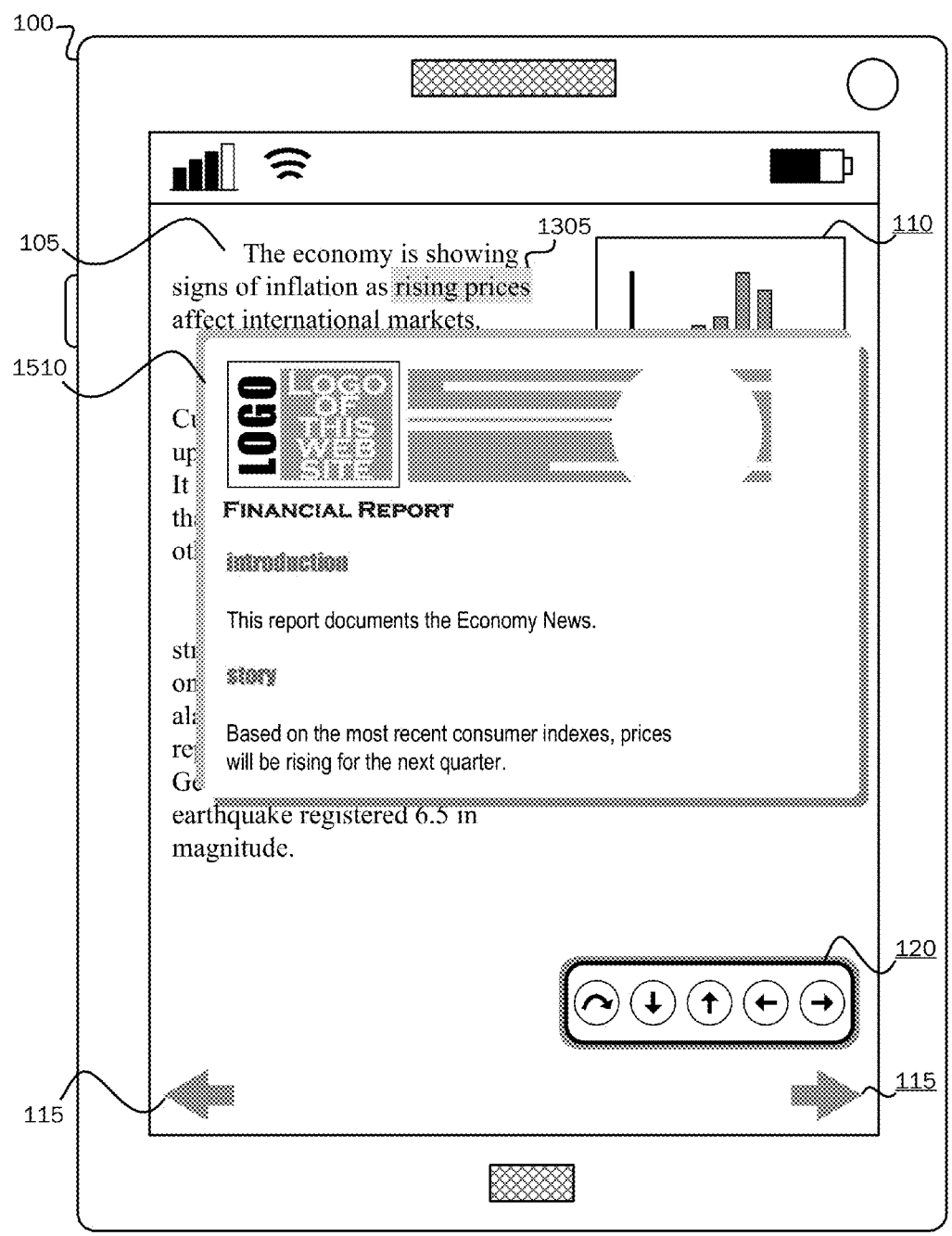
FIG. 15 is simplified block diagram illustrating a computer-generated display showing a document and showing a display of supporting content or information associated with related content or information displayed in the document

Referring to FIG. 15, according to one embodiment, the user may select the transparent user interface component 1410 to cause a live version of the associated Internet-based web site/page 1510 to be displayed over the document 105 on the display screen of the computing device 100. That is, the web site/page 1510, illustrated in FIG. 15, may be in the form of a live web page with which the user may review all content displayed in the web page by browsing the web page as it overlays the document 105. Thus, the application 1920 or the application 1920 in association with an Internet-based browsing application provides for an overlay of a live web site/page onto a document for reviewing the web site/page for information of interest to the user in association with the document being created or edited by the user. According to embodiments, as the user browses through the web site/page 1510 displayed over the document 105, if the user finds information in the web page 1510 that he/she would like to incorporate into the document 105, the user may copy desired information and either paste the information into the document 105, or using the functionality of the application 1920, the user may cause selected content from the web page 1510 to be automatically and parenthetically applied to the document 105.

Figure 16:
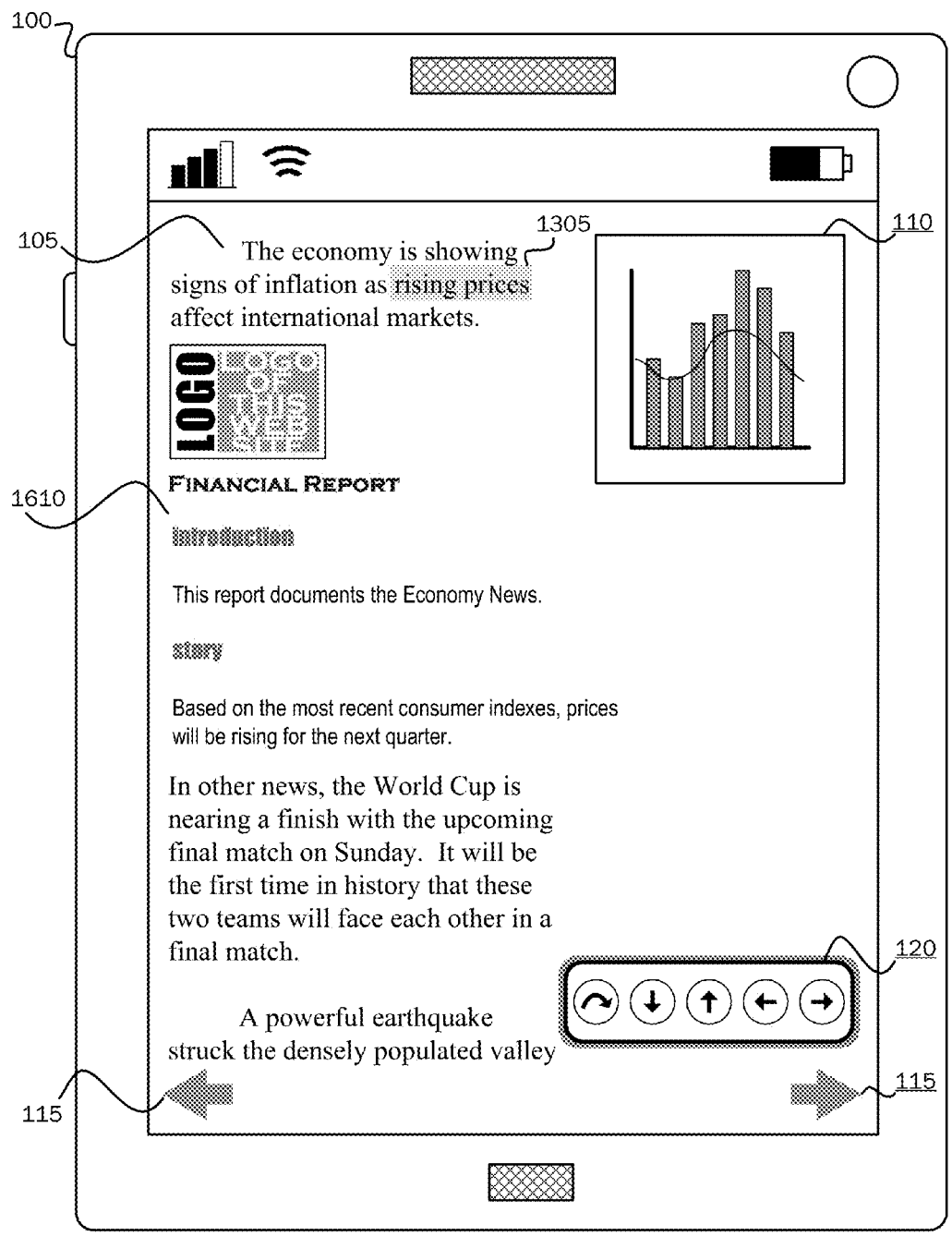
FIG. 16 is simplified block diagram illustrating a computer-generated display showing a document and showing a display of supporting content or information associated with related content or information displayed in the document

Referring now to FIG. 16, according to another embodiment, the web site/page 1510 from FIG. 15 may be inserted "in line" or "between the lines" into the text of the document 105 as a live web site/page existing between the lines or between paragraphs of the document 105. That is, after insertion of the live web site/page 1610 between the lines or between paragraphs of the document 105, as illustrated in FIG. 16, the word processing application-based text of the document 105, the chart 110, and the live web page 1610 may coexist in the same document, and application functionality associated with each of the content types may be operable with respect to each of the content types on demand by the user. That is, when the user focuses on, selects, edits, or otherwise manipulates a portion of the text of the document 105, the user may be provided with word processing application functionality by the application 1920 or by the application 1920 in association with a separate word processing application. Likewise, if a user focuses on, selects, edits, or otherwise manipulates the chart 110, the user may be provided with application functionality associated with the chart 110, for example, spreadsheet functionality. When the user focuses on, edits, manipulates or otherwise interacts with the live web page 1610 inserted parenthetically between the lines or paragraphs of the document 105, then Internet browser application functionality may be provided to the user to allow the user to interact with the web page that is now part of the document 105.

As described above, application functionality associated with received content items may function with the received content items after the content items are incorporated into the first content item (e.g., document). Various methods are available for allowing imported document content to call back to the application from which it came or to another application having the same functionality for allowing the imported content to operate according to its native application functionality. One method includes object linking and embedding (OLE). According to embodiments of the present invention, in addition to enabling the use of native functionality with imported content, navigation is enabled between document content and the imported or embedded content where the user may navigate freely between preexisting content and imported or embedded content, while also allowing for the mapping, rearranging, view-to-view pivoting, etc. described above.

According to one embodiment, each time the user focuses on a portion of the document 105 associated with a different application functionality, selectable buttons and controls for providing functionality, for example, formatting buttons, editing buttons, printing buttons, and the like, may be provided in a user interface component for providing the associated functionality to the user. For example, if the user is focusing on a text portion of the document, word processing functionality buttons and controls may be provided in a user interface component for selection by a user with respect to the text component. For another example, if the user focuses or interacts with the live web page 1610, selectable buttons and controls for web browsing applications may be provided to the user for interacting with the web page 1610, and so on. For more information on the provision of context-based functionality, see U.S. patent application Ser. No. 10/955,940, filed Sep. 30, 2004, titled "User Interface for Displaying Selectable Software Functionality Controls that are Contextually Relevant to a Selected Object, which is incorporated herein by reference as if fully set out herein.

Figure 17:
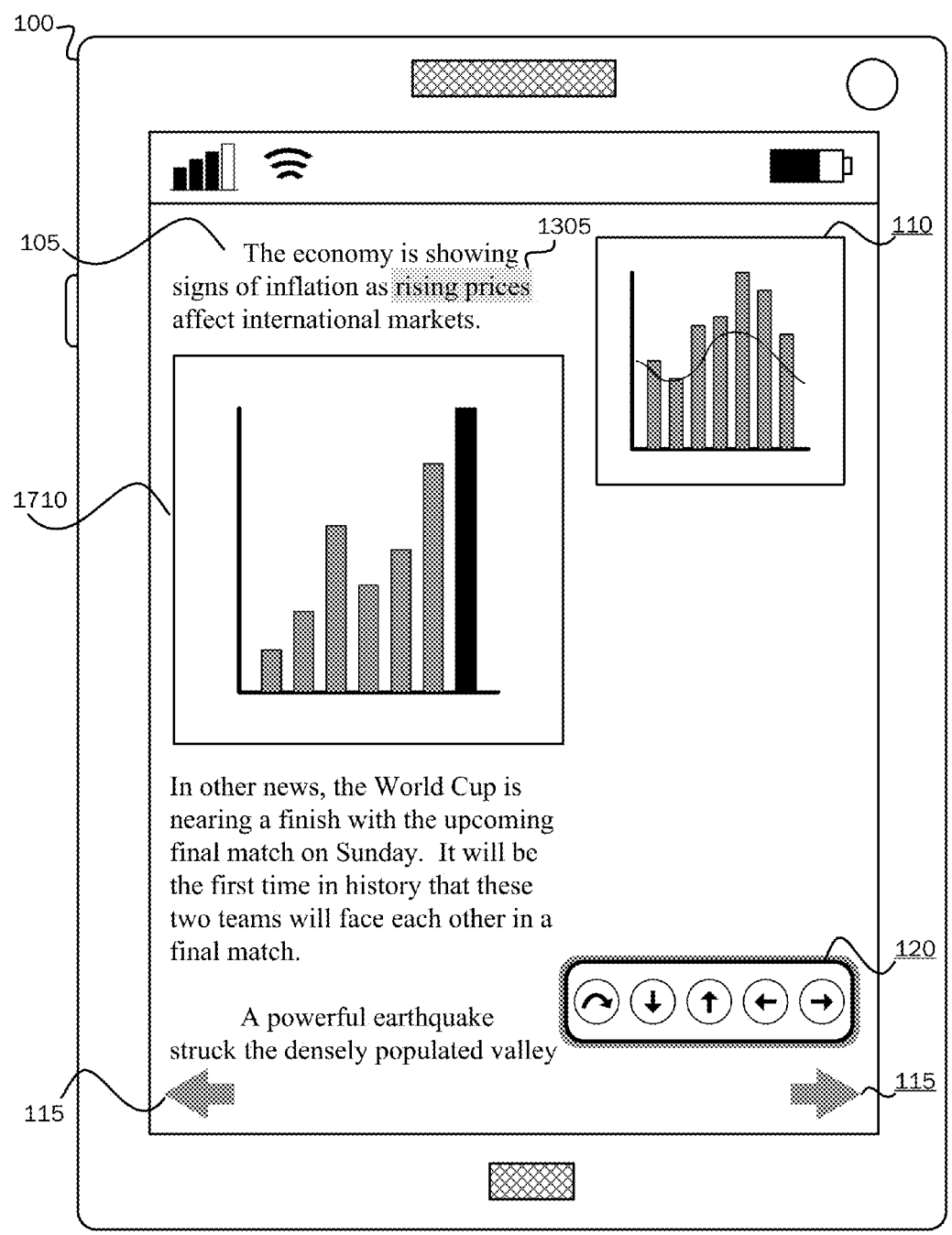
FIG. 17 is simplified block diagram illustrating a computer-generated display showing a document and showing a display of supporting content or information associated with related content or information displayed in the document.

As illustrated in FIG. 17, any other content item 1710 associated with any other suitable application functionality may be displayed and subsequently inserted parenthetically, as desired. For example, content retrieved from a slide presentation application, content retrieved from a spreadsheet application, content retrieved from a notes application, content retrieved from a photographic application, and the like may be retrieved and may be displayed in a transparent user interface component, followed by parenthetical insertion of the retrieved content. For example, in FIG. 17, a slide presentation slide 1710 containing chart information has been generated and has been inserted parenthetically into document 105.

As described above, the slide presentation application slide 1710 may exist in the document 105 as a live component associated with the application functionality from which it was generated. That is, if the component 1710 is illustrative of a slide presentation application slide, then selection of the slide 1710 for editing, manipulating, or otherwise interacting with the slide may provide the user application functionality associated with a slide presentation application in the same manner as described above for the web site/page 1610 and other content. For example, instead of inserting a particular slide presentation slide into the document 105, a slide presentation containing many slides may be inserted parenthetically into the document 105. Then, the user may navigate the inserted slide presentation to include picking among the various included slides for a particular slide of interest. If the user moves his/her focus out of the slide presentation object in to the text object, he/she may likewise navigate the text object according to its associated functionality, for example, word processing application functionality.

Having described a system architecture for embodiments of the present invention above with respect to FIGS. 1-17, FIG. 18 illustrates a process flow according to a method for application of multiple content types and functionalities to an electronic content item. The method 1800 begins at a start operation 1805 and proceeds to operation 1810 where a structured content item, for example, a document 105 illustrated in FIG. 1 is received by the multiple content functionality application 1920 for display and for editing if desired by a user. As described above with reference to FIGS. 9, 10, 11, 12, structuring document portions or components (e.g., application or annotation of content portions or components with metadata) allows for use of the functionality described herein with respect to various portions or components of the document 105. At operation 1820, a variety of content navigation means may be enabled for allowing a user to navigate through the document content in a non-linear manner, as described above.

At operation 1830, various views of the received content may be provided to allow a user to view the received content in a variety of ways. For example, as described above with reference to FIGS. 4-8, received content may be provided in views allowing a user to see content the user has previously viewed or interacted with, content the user or other users have not viewed or interacted with, and content that has been changed or revised. Other views may be provided comprising only components or portions of a document viewed or interacted with by one or more other users, and views may be provided showing comparisons between versions of documents or content items, for example, server-based content versus client-based content. In addition, content views may be displayed according to a variety of different formats, as illustrated above with respect to FIG. 4B.

At operation 1840, a variety of content structure views may be provided showing components of a document or other content item according to one or more mappings that may be used for document navigation or for document generation, as illustrated and described above with reference to FIGS. 9-12.

At operation 1850, content input may be received via a variety of local and/or remote sources, as described above with reference to FIGS. 14-17. Received content may be displayed for review only, or received content may be inserted parenthetically into a receiving document or other content item, and application functionality associated with received content may be provided for the received content in its place within the receiving document, as described above. According to one embodiment, these functions illustrated at operation 1850 may occur at other times during the routine 1800, for example, after operation 1810 when structured content is received. In addition to application functionality associated with received content items, navigation of those received content items, as well, as navigation of previously received content items is enabled while focus is placed on the various portions or components of the document, as described above with reference to FIGS. 13-17. The routine 1800 ends at operation 1895.

Figure 18:
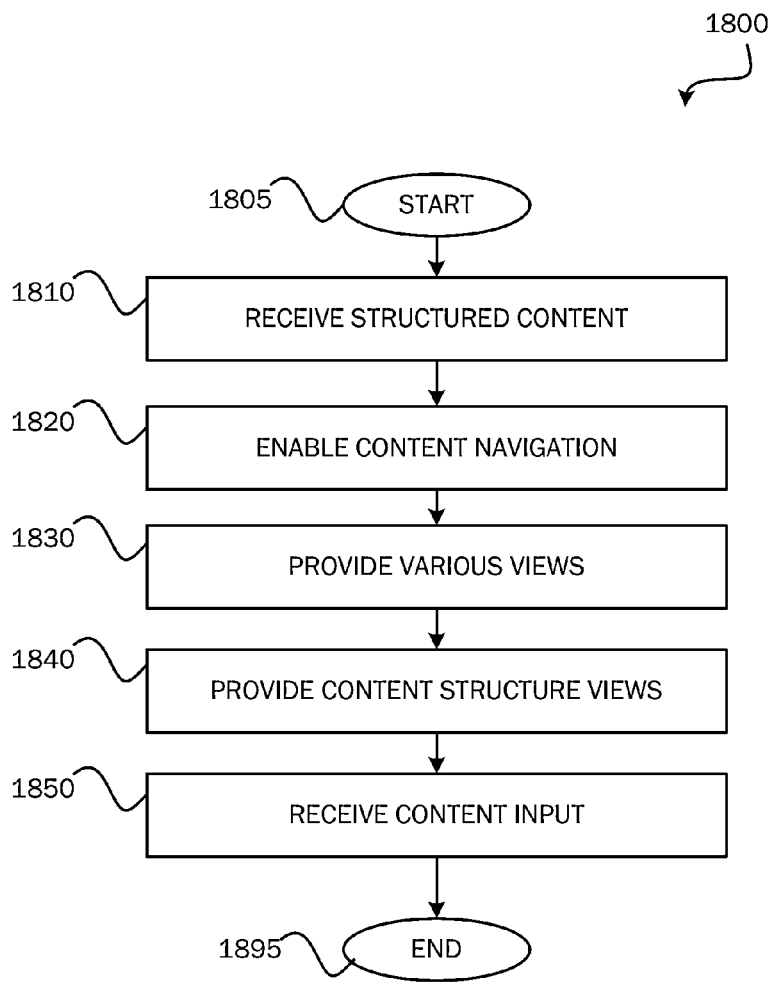
FIG. 18 illustrates a process flow according to a method for application of multiple content types and functionalities to an electronic content item.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 19-21 and the associated descriptions provide a discussion of a variety of operating environments in which embodiments of the invention may be practiced. However, the devices and systems illustrated and discussed with respect to FIGS. 18-20 are for purposes of example and illustration and are not limiting of a vast number of computing device configurations that may be utilized for practicing embodiments of the invention, described herein.

Figure 19:
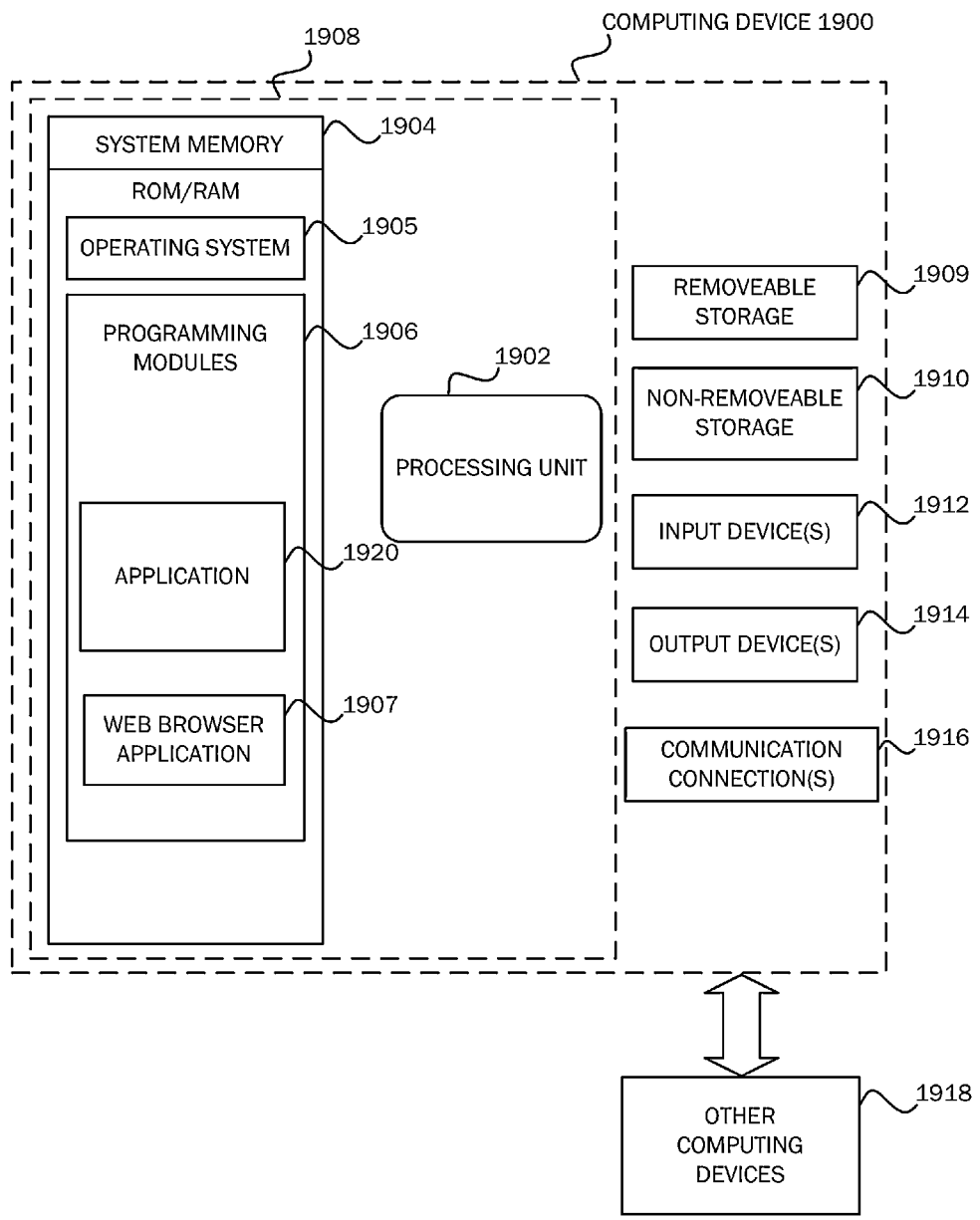
FIG. 19 is a simplified block diagram of a computing device with which embodiments of the present invention may be practiced.

FIG. 19 is a block diagram illustrating example physical components of a computing device 1900 with which embodiments of the invention may be practiced. The computing device components described below may be suitable for the computing devices described above, for example, the computing device 100. In a basic configuration, computing device 1900 may include at least one processing unit 1902 and a system memory 1904. Depending on the configuration and type of computing device, system memory 1904 may comprise, but is not limited to, volatile (e.g. random access memory (RAM)), non-volatile (e.g. read-only memory (ROM)), flash memory, or any combination. System memory 1904 may include operating system 1905, one or more programming modules 1906, and may include the multiple content functionality application 1920. Operating system 1905, for example, may be suitable for controlling computing device 1900's operation. Furthermore, embodiments of the invention may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910.

As stated above, a number of program modules and data files may be stored in system memory 1904, including operating system 1905. While executing on processing unit 1902, programming modules 1906, such as the multiple content functionality application 1920 may perform processes including, for example, one or more method 1800's stages as described above. The aforementioned process is an example, and processing unit 1902 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 19 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to multiple content functionality application 1920 may be operated via application-specific logic integrated with other components of the computing device/system 1900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, etc. Output device(s) 1914 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 20A:
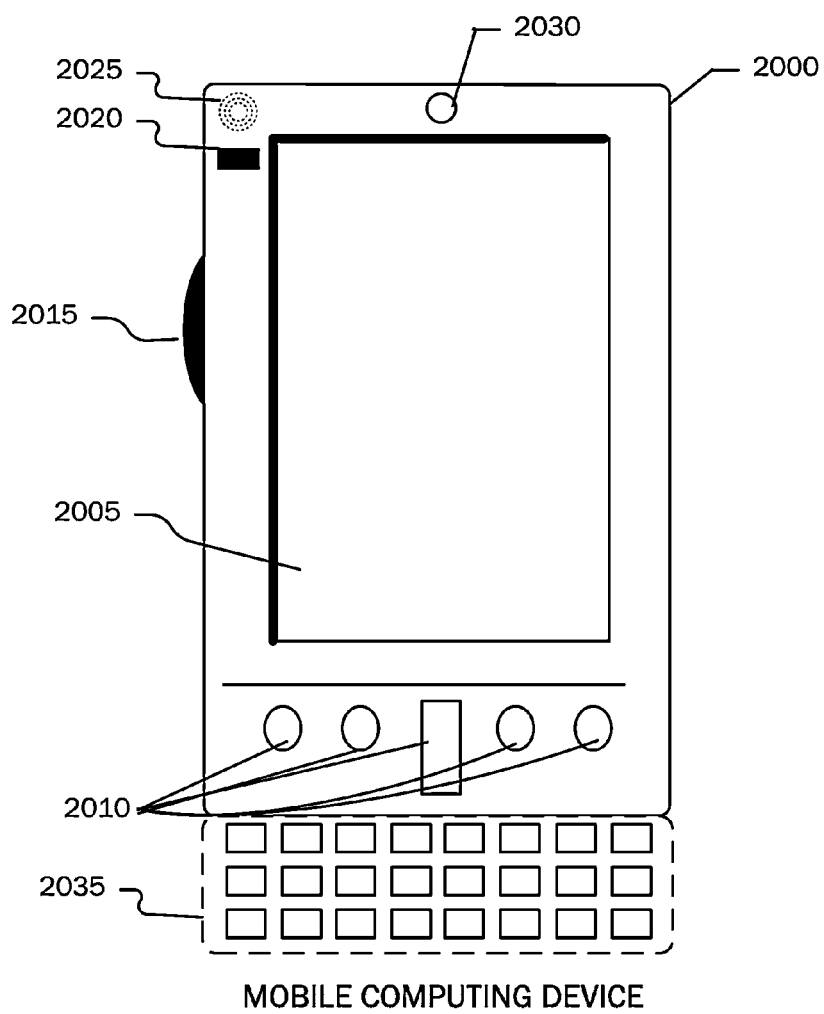
FIGS. 20A and 20B are simplified block diagrams of a mobile computing device with which embodiments of the present invention may be practiced.
Figure 20B:
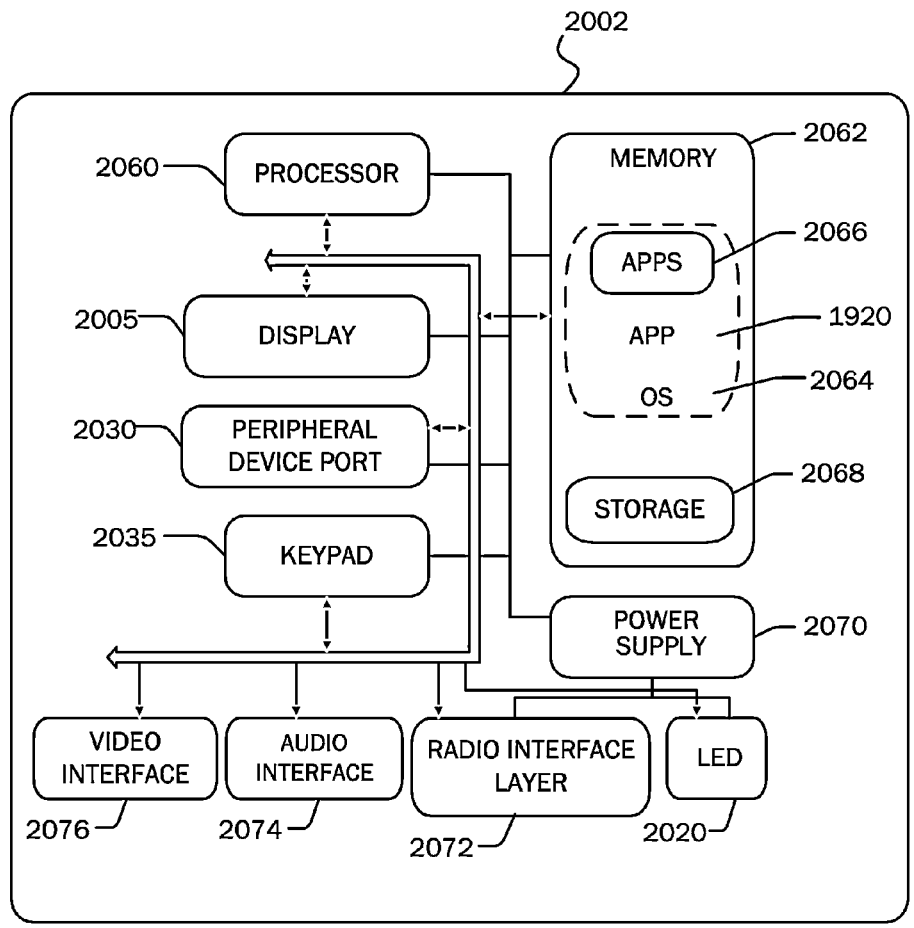

FIGS. 20A and 20B illustrate a suitable mobile computing environment, for example, a mobile telephone 2000, a smartphone, a tablet personal computer, a laptop computer, and the like, with which embodiments of the invention may be practiced. With reference to FIG. 20A, an example mobile computing device 2000 for implementing the embodiments is illustrated. In a basic configuration, mobile computing device 2000 is a handheld computer having both input elements and output elements. Input elements may include touch screen display 2005 and input buttons 2010 that allow the user to enter information into mobile computing device 2000. Mobile computing device 2000 may also incorporate an optional side input element 2015 allowing further user input. Optional side input element 2015 may be a rotary switch, a button, or any other type of manual input element. In alternative embodiments, mobile computing device 2000 may incorporate more or less input elements. For example, display 2005 may not be a touch screen in some embodiments. In yet another alternative embodiment, the mobile computing device is a portable phone system, such as a cellular phone having display 2005 and input buttons 2010. Mobile computing device 2000 may also include an optional keypad 2035. Optional keypad 2035 may be a physical keypad or a "soft" keypad generated on the touch screen display.

Mobile computing device 2000 incorporates output elements, such as display 2005, which can display a graphical user interface (GUI). Other output elements include speaker 2025 and LED light 2020. Additionally, mobile computing device 2000 may incorporate a vibration module (not shown), which causes mobile computing device 2000 to vibrate to notify the user of an event. In yet another embodiment, mobile computing device 2000 may incorporate a headphone jack (not shown) for providing another means of providing output signals.

Although described herein in combination with mobile computing device 2000, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 20B is a block diagram illustrating components of a mobile computing device used in one embodiment, such as the computing device shown in FIG. 20A. That is, mobile computing device 2000 can incorporate system 2002 to implement some embodiments. For example, system 2002 can be used in implementing a "smart phone" that can run one or more applications similar to those of a desktop or notebook computer such as, for example, browser, e-mail, scheduling, instant messaging, and media player applications. In some embodiments, system 2002 is integrated as a computing device, such as an integrated personal digital assistant (PDA) and wireless phone.

One or more application programs 2066 may be loaded into memory 2062 and run on or in association with operating system 2064. Examples of application programs include phone dialer programs, e-mail programs, PIM (personal information management) programs, word processing programs, spreadsheet programs, Internet browser programs, messaging programs, and so forth. System 2002 also includes non-volatile storage 2068 within memory 2062. Non-volatile storage 2068 may be used to store persistent information that should not be lost if system 2002 is powered down. Applications 2066 may use and store information in non-volatile storage 2068, such as e-mail or other messages used by an e-mail application, and the like. A synchronization application (not shown) also resides on system 2002 and is programmed to interact with a corresponding synchronization application resident on a host computer to keep the information stored in non-volatile storage 2068 synchronized with corresponding information stored at the host computer. As should be appreciated, other applications may be loaded into memory 2062 and run on the device 2000, including the multiple content functionality application 1920, described herein.

System 2002 has a power supply 2070, which may be implemented as one or more batteries. Power supply 2070 might further include an external power source, such as an AC adapter or a powered docking cradle that supplements or recharges the batteries.

System 2002 may also include a radio 2072 that performs the function of transmitting and receiving radio frequency communications. Radio 2072 facilitates wireless connectivity between system 2002 and the "outside world", via a communications carrier or service provider. Transmissions to and from radio 2072 are conducted under control of OS 2064. In other words, communications received by radio 2072 may be disseminated to application programs 2066 via OS 2064, and vice versa.

Radio 2072 allows system 2002 to communicate with other computing devices, such as over a network. Radio 2072 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 2002 is shown with two types of notification output devices; LED 2020 that can be used to provide visual notifications and an audio interface 2074 that can be used with speaker 2025 to provide audio notifications. These devices may be directly coupled to power supply 2070 so that when activated, they remain on for a duration dictated by the notification mechanism even though processor 2060 and other components might shut down for conserving battery power. LED 2020 may be programmed to remain on indefinitely until the user takes action to indicate the powered-on status of the device. Audio interface 2074 is used to provide audible signals to and receive audible signals from the user. For example, in addition to being coupled to speaker 2025, audio interface 2074 may also be coupled to a microphone to receive audible input, such as to facilitate a telephone conversation. In accordance with embodiments of the present invention, the microphone 1920 may also serve as an audio sensor to facilitate control of notifications, as will be described below. System 2002 may further include video interface 2076 that enables an operation of on-board camera 2030 to record still images, video stream, and the like.

A mobile computing device implementing system 2002 may have additional features or functionality. For example, the device may also include additional data storage devices (removable and/or non-removable) such as, magnetic disks, optical disks, or tape. Such additional storage is illustrated in FIG. 20B by storage 2068. Computer storage media may include volatile and nonvolatile, removable and non-removable media implemented in any method or technology for storage of information, such as computer readable instructions, data structures, program modules, or other data.

Data/information generated or captured by the device 2000 and stored via the system 2002 may be stored locally on the device 2000, as described above, or the data may be stored on any number of storage media that may be accessed by the device via the radio 2072 or via a wired connection between the device 2000 and a separate computing device associated with the device 2000, for example, a server computer in a distributed computing network, such as the Internet. As should be appreciated such data/information may be accessed via the device 2000 via the radio 2072 or via a distributed computing network. Similarly, such data/information may be readily transferred between computing devices for storage and use according to well-known data/information transfer and storage means, including electronic mail and collaborative data/information sharing systems.

Figure 21:
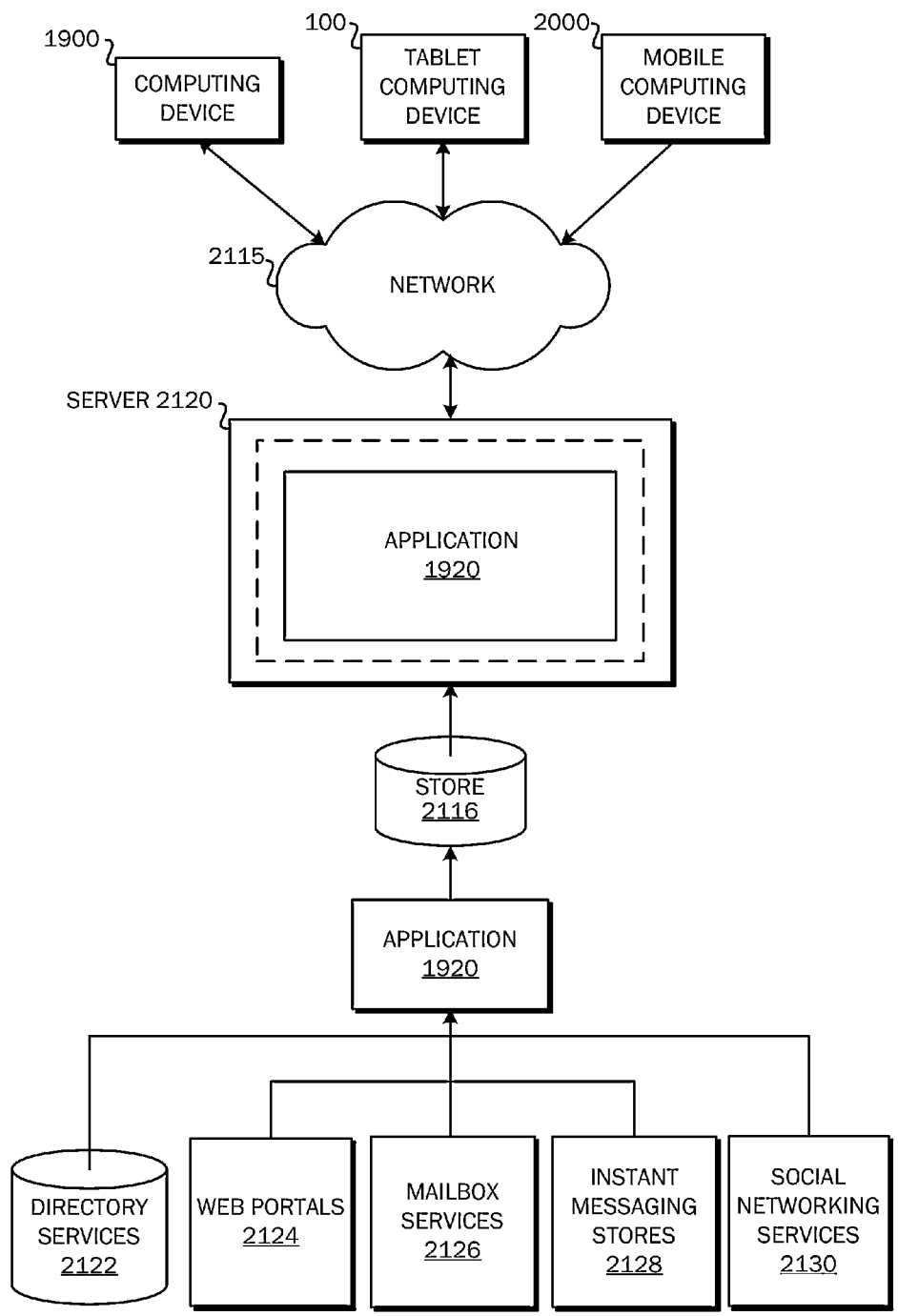
FIG. 21 is a simplified block diagram of a distributed computing system in which embodiments of the present invention may be practiced.

FIG. 21 illustrates a system architecture for providing communications and content associated a multiple content functionality application 1920, as described above. Content developed, interacted with or edited in association with a multiple content functionality application may be stored in different communication channels or other storage types. For example, various content items along with information from which they are developed may be stored using directory services 2122, web portals 2124, mailbox services 2126, instant messaging stores 2128 and social networking sites 2130. The multiple content functionality application 1920 may use any of these types of systems or the like for enabling content utilization, as described herein. A server 2120 may provide content items to clients. As one example, server 2120 may be a web server providing content over the web. Server 2120 may provide online collaborative work sessions and content over the web to clients through a network 2115. Examples of clients that may obtain collaborative work session communications and content include computing device 1900, which may include any general purpose personal computer, a tablet computing device 100 and/or mobile computing device 2000 which may include smart phones. Any of these devices may obtain content from the store 2116.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing multiple content components and associated application functionality in an electronic document; comprising:
   receiving a plurality of content items in an electronic document, each of the plurality of content items being associated with one of a plurality of content component types having a different application functionality;
   displaying the electronic document in a computer-enabled content user interface;
   providing a navigation user interface component in the electronic document for allowing non-linear navigation of the electronic document, the navigation user interface component in the electronic document including one or more selectable controls associated with navigation to each of the plurality of content component types contained in the electronic document, such that selection of a selectable control causes navigation to a particular one type of the plurality of content component types associated with the selectable control, wherein the navigation user interface allows navigation to each content item of the particular one type; and
   in response to navigating to the particular one type of the plurality of content component types, providing application functionality associated with the particular one of the plurality of content component types for interacting with each content item of the particular one type of the plurality of content component types.

2. The method of claim 1, wherein the navigation user interface component in the electronic document includes a navigation gallery containing one or more selectable controls associated with one or more of the plurality of content component types or associated with one or more other content component types associated with the plurality of content component types.

3. The method of claim 1, wherein allowing navigation of the electronic document includes causing a display of two or more views of the electronic document simultaneously for allowing a comparison of the two or more views of the electronic document and for allowing navigation in each of the two or more views of the electronic document.

4. The method of claim 3, wherein causing a display of two or more views of the electronic document simultaneously for allowing a comparison of the two or more views of the electronic document includes displaying a first view of the electronic document having a first set of document attributes associated with a first interaction with the electronic document and displaying a second view of the electronic document having a second set of document attributes associated with a second interaction with the electronic document for allowing a comparison between of the first view of the electronic document with the second view of the electronic document.

5. The method of claim 1, further comprising providing a navigable mapping of one or more portions of the electronic document, such that selection of a mapping component from the navigable mapping causes navigation to a portion of the electronic document corresponding to the selected mapping component.

6. The method of claim 5, wherein providing the navigable mapping of the one or more portions of the electronic document includes providing a navigable mapping of one or more portions of the electronic document that comprise a subset of all portions of the electronic document.

7. The method of claim 6, further comprising receiving a selection of the navigable mapping of one or more portions of the electronic document that comprise a subset of all portions of the electronic document, and displaying a second electronic document comprised of the one or more portions of the electronic document comprising the subset of all portions of the electronic document.

8. The method of claim 7, further comprising allowing pivoting between the first and second electronic documents wherein upon pivoting to the first electronic document, displaying all portions of the first electronic document and wherein upon pivoting to the second electronic document, displaying the subset of all the portions of the first electronic document associated with the second electronic document.

9. The method of claim 7, wherein the subset of all portions of the electronic document includes those portions of the electronic document viewed by one or more users.

10. The method of claim 7, wherein the subset of all portions of the electronic document includes those portions of the electronic document not viewed by one or more users.

11. The method of claim 7, wherein the subset of all portions of the electronic document includes those portions of the electronic document for which feedback is received from one or more users, wherein feedback includes whether one or more users liked, disliked or commented on one or more portions of the electronic document.

12. The method of claim 7, wherein the subset of all portions of the electronic document includes those portions of the electronic document marked for interest by one or more users.

13. The method of claim 7, wherein the subset of all portions of the electronic document includes those portions of the electronic document edited by one or more users.

14. The method of claim 7, wherein the subset of all portions of the electronic document includes those portions of the electronic document not edited by one or more users.

15. The method of claim 5, further comprising displaying a gallery of different visuals for representing different navigations of the electronic document, wherein the different visuals include one or more user interface (UI) choices, each of the one or more UI choices including a different means for navigation of the electronic document.

16. A computing device for providing multiple content components and associated application functionality in an electronic document; comprising:
   a processor; and
   a system memory, including computer executable instructions which when executed by a processor, cause the computing device to be operable to:
      receive a plurality of content items in an electronic document, each of the plurality of content items being associated with one of a plurality of content component types having a different application functionality;

display the electronic document in a computer-enabled content user interface;

provide a navigation user interface component in the electronic document for allowing non-linear navigation of the electronic document, the navigation user interface component in the electronic document including one or more selectable controls associated with navigation to each of the plurality of content component types contained in the electronic document, such that selection of a selectable control causes navigation to a particular one type of the plurality of content component types associated with the selectable control, wherein the navigation user interface allows navigation to each content item of the particular one type; and in response to navigating to the particular one type of the plurality of content component types, provide application functionality associated with the particular one type of the plurality of content component types for interacting with each content item of the particular one type of the plurality of content component types.

17. A method of providing multiple content components and associated application functionality in an electronic document; comprising:

displaying an electronic document in a computer-enabled content user interface, the electronic document including a plurality of document items, each document item of the plurality of document items being associated with one of a plurality of content component types in the electronic document; and providing a navigation user interface component in the electronic document for allowing non-linear navigation of the electronic document, the navigation user interface component in the electronic document including one or more selectable controls associated with navigation to each of the plurality of document component types contained in the electronic document, such that selection of a selectable control causes navigation to content items associated with a particular one type of the plurality of document component types associated with the selectable control, wherein the navigation user interface allows navigation to each content item associated with the particular one type.

18. The method of claim 17, wherein the navigation user interface component in the electronic document includes a navigation gallery containing one or more selectable controls associated with one or more portions of the content item or associated with one or more other content items associated with the content item.

19. The method of claim 17, wherein allowing navigation in the content item includes causing a display of two or more content items simultaneously for allowing a comparison of the two or more content items and for allowing navigation in each of the two or more content items.

* * * * *